United States Patent
Baek et al.

(10) Patent No.: US 11,853,968 B2
(45) Date of Patent: Dec. 26, 2023

(54) GENERATING AND PROVIDING COLLECTIONS OF COLLABORATIVE CONTENT ITEMS TO TEAMS OF USER ACCOUNTS

(71) Applicant: Dropbox, Inc., San Francisco, CA (US)

(72) Inventors: Jongmin Baek, Foster City, CA (US); Sarah Andrabi, Seattle, WA (US); Kristian Concepcion, New York, NY (US)

(73) Assignee: Dropbox, Inc., San Francisco, CA (US)

( * ) Notice: Subject to any disclaimer, the term of this patent is extended or adjusted under 35 U.S.C. 154(b) by 243 days.

(21) Appl. No.: 17/153,686

(22) Filed: Jan. 20, 2021

(65) Prior Publication Data

US 2022/0230138 A1     Jul. 21, 2022

(51) Int. Cl.
G06Q 10/0633     (2023.01)
G06Q 10/101     (2023.01)

(52) U.S. Cl.
CPC ....... *G06Q 10/101* (2013.01); *G06Q 10/0633* (2013.01)

(58) Field of Classification Search
None
See application file for complete search history.

(56) References Cited

U.S. PATENT DOCUMENTS

| | | | |
|---|---|---|---|
| 9,858,308 B2 | 1/2018 | Gong et al. | |
| 10,380,505 B2 | 8/2019 | Gaon et al. | |
| 10,832,219 B2 | 11/2020 | Jersin et al. | |
| 2006/0031288 A1 | 2/2006 | Ter Horst et al. | |
| 2017/0169391 A1* | 6/2017 | Mo | G06Q 10/103 |
| 2017/0206276 A1 | 7/2017 | Gill | |
| 2018/0189693 A1* | 7/2018 | Newhouse | G06Q 10/0631 |

(Continued)

FOREIGN PATENT DOCUMENTS

| | | | | |
|---|---|---|---|---|
| GB | 2372401 A | * | 8/2002 | G06Q 10/10 |
| WO | WO-2015188885 A1 | | 12/2015 | |

OTHER PUBLICATIONS

Tacla et al., An abstract model for identifying potential teams and communities, 2013, IEEE 17th International Conference on Computer Supported Cooperative Work in Design (CSCWD) (pp. 263-268) (Year: 2013).*

(Continued)

*Primary Examiner* — Rutao Wu
*Assistant Examiner* — Zahra Elkassabgi
(74) *Attorney, Agent, or Firm* — Keller Preece PLLC

(57) ABSTRACT

The present disclosure is directed toward systems, methods, and non-transitory computer readable media for generating and providing team-specific collections of collaborative content items. For example, the disclosed systems can determine relationships between teams of user accounts and various collaborative content items. Based on the determined relationships, the disclosed systems can identify which collaborative content items are germane to which teams and can provide the collaborative content items to user accounts accordingly. As part of determining relationships between collaborative content items and user accounts (or teams of user accounts), the disclosed systems can determine various information pertaining to the collaborative content items, including access patterns, sharing patterns, activity information, and geographic information.

20 Claims, 16 Drawing Sheets

(56) References Cited

U.S. PATENT DOCUMENTS

2018/0232644 A1    8/2018   Acharya et al.
2019/0333128 A1    10/2019  Barbour et al.
2020/0327500 A1*   10/2020  Newhouse ............ G06F 3/0482
2022/0019741 A1*   1/2022   Roy ........................ G06F 40/30
2022/0188773 A1*   6/2022   van Rensburg ........ G06Q 30/02

OTHER PUBLICATIONS

Jenkin T A., et al., "Novel Information Discovery and Collaborative Filtering to Support Group Creativity," 28 pages.

Luo C., "Hete-CF: Social-Based Collaborative Filtering Recommendation Using Heterogeneous Relations," Dec. 24, 2014, 11 pages.

Xue F., et al., "Deep Item-based Collaborative Filtering for Top-N Recommendation," Nov. 11, 2018, 25 pages.

\* cited by examiner

Fig. 8C

Project Athos

Meeting Minutes · Schedule

Coding Tips and Tricks

How to Program with Our Team

Rules for Coding

Evelyn Smith

Create New File
- New Document
- Upload File
- New Folder
- New Shared Folder

Create New Binder for Project Athos — 812
- New Section for Coding Rules — 814
- Upload File

Sidebar:
- Home
- Files
  - All Files
  - Shared
  - File Request
  - Deleted Files
- Tools
  - Spaces
  - Paper
  - Hellosign
  - Transfer
  - Showcase
  - Binders 108a

GENERATING AND PROVIDING COLLECTIONS OF COLLABORATIVE CONTENT ITEMS TO TEAMS OF USER ACCOUNTS

BACKGROUND

Advancements in computing devices and networking technology have led to a variety of innovations in providing digital content to, and sharing digital content among, user accounts. For example, online digital content systems are now able to provide access to digital content items across many devices all over the world. Existing systems are also able to synchronize changes to shared digital content across the devices. Indeed, whether in education, employment, or other domains, modern online digital content systems are able to provide access to digital content for users to collaborate together across diverse physical locations and through a variety of computing devices. Despite these advances, however, existing digital content systems continue to suffer from a number of disadvantages, particularly in their flexibility, accuracy, and efficiency.

As just mentioned, existing digital content systems are often inflexible. More specifically, some existing systems rigidly require manual curation of relevant documents for providing to user accounts. Indeed, digital content is often fluid and changing (e.g., as users access and edit digital content items), and teams of user accounts are also constantly in flux as user accounts are added and removed from various teams over time (which often changes ownership of digital content as well). To maintain relationships between digital content and user accounts, existing systems rigidly rely on particular user accounts (e.g., specialized accounts) to manually curate the digital content to indicate which digital content items are germane to which user accounts (e.g., by manually creating and maintaining share folders).

Due at least in part to their inflexible nature, existing digital content systems inaccurately identify relevant digital content items to provide to user accounts. In particular, because of the onerous requirements of manual content curation in some existing systems, these existing systems often fall into disarray due to neglect. Thus, existing systems end up providing out-of-date, inaccurate information for surfacing relevant digital content to user accounts. In some cases, the existing system inaccuracies will result in providing irrelevant digital content to user accounts, while in other cases, these existing systems omit relevant digital content items when surfacing content to user accounts.

Additionally, many existing digital content systems inefficiently utilize computing resources such as processing time, processing power, and memory. For example, manually curating digital content and relationships between digital content and user accounts is time consuming and computationally expensive. Indeed, not only does the inflexibility of existing systems lead to inaccurate relationships between digital content items and user accounts, but such inflexibility further results in inefficient graphical user interfaces that often require an excessive number of user interactions for manual curation. For example, a existing system that requires manual content curation requires a client device or a server to process user interactions for indicating and updating relationships of each digital content item in relation to potentially large numbers of user accounts. Having to (frequently) navigate through the large numbers of digital content items to update germaneness relative to various user accounts in this way requires an excessive number of user interactions. Additionally, processing these user interactions wastes computing resources that could otherwise be avoided.

Thus, there are several disadvantages with regard to existing digital content systems.

SUMMARY

One or more implementations described herein provide benefits and solve one or more of the foregoing or other problems in the art by providing systems, methods, and non-transitory computer readable media that can generate and distribute team-specific collections of collaborative content items. In particular, the disclosed systems can determine relationships between teams of user accounts within an organizational ontology and various collaborative content items. Based on the determined relationships, the disclosed systems can identify which collaborative content items are relevant to which teams and can provide the collaborative content items to user accounts accordingly. As part of determining relationships between collaborative content items and user accounts (or teams of user accounts), the disclosed systems can determine various types of information pertaining to the collaborative content items. For example, the disclosed systems can determine access patterns, sharing patterns, types of activity (e.g., viewing vs. editing) performed, and other information associated with collaborative content items. Utilizing this information, the disclosed systems can generate team-specific collections of collaborative content items by identifying teams within an organizational ontology corresponding to the collaborative content items. In some embodiments, the disclosed systems can also provide graphical user interfaces for creating and managing team collections of collaborative content items.

Additional features and advantages of the present application will be set forth in the description which follows, and in part will be obvious from the description, or may be learned by the practice of such example implementations.

BRIEF DESCRIPTION OF THE DRAWINGS

This disclosure will describe one or more implementations of the invention with additional specificity and detail by referencing the accompanying figures. The following paragraphs briefly describe those figures, in which:

FIG. 8C illustrates an example collaborative team space interface in accordance with one or more embodiments;

DETAILED DESCRIPTION

Figure 1:
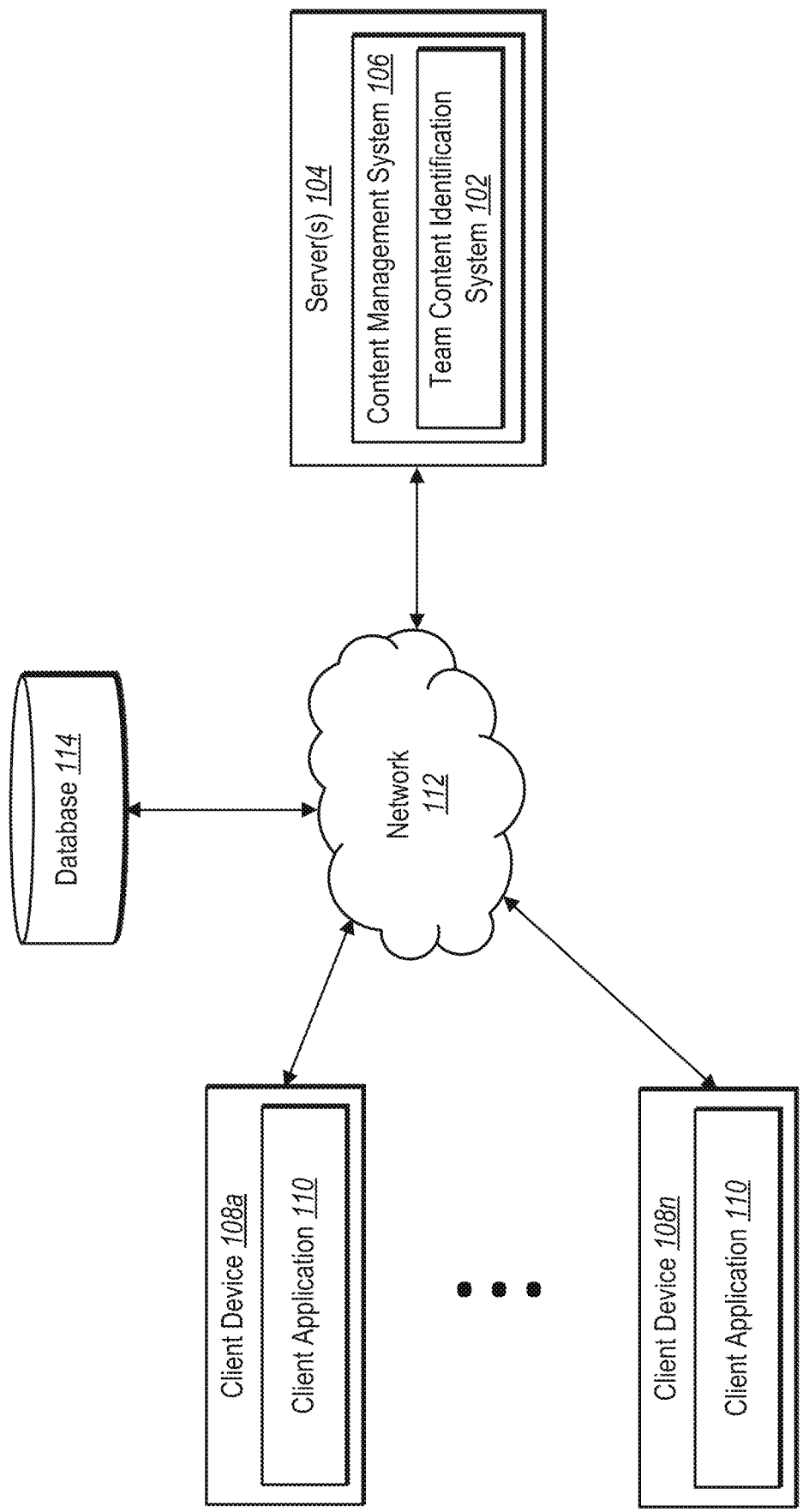
FIG. 1 illustrates a schematic diagram of an example environment of a team content identification system in accordance with one or more embodiments.

One or more implementations described herein provide benefits and solve one or more of the foregoing or other problems in the art with a team content identification system that can generate and provide team content collections to user accounts belonging to teams within an organizational ontology. In particular, the team content identification system can access an organizational ontology that includes various parent nodes and child nodes indicating relationships between teams of user accounts. In addition, the team content identification system can generate team content collections to provide to various teams within the organizational ontology. To generate a team content collection, the team content identification system can determine relationships between teams (or user accounts within teams) and collaborative content items. Based on the relationships, the team content identification system can identify which collaborative content items to provide to which teams within the organizational ontology. Thus, the team content identification system can generate team content collections including the collaborative content items and can provide the team content collections to user accounts belonging to the respective teams.

To illustrate by way of an example, the team content identification system can automatically (e.g., without user interaction) generate and provide a team content collection for onboarding a new team member. For instance, if a new user account is added to a particular team of user accounts within an organization, the team content identification system determines relationships between the new user account and a number of stored collaborative content items. Based on the relationships, the team content identification system further generates a team content collection to provide to the new user account, including collaborative content items arranged or grouped into sections based on subject matter or semantic meaning. In some embodiments, an addition (or alternatively) to grouping collaborative content item into sections, the team content identification system generates and assigns tags for the collaborative content items based on the relationships. Thus, the team content identification system identifies and provides necessary or relevant collaborative content items to the new user account automatically. This example is merely illustrative, and additional implementations and examples are possible, as described in more detail below.

As just mentioned, in one or more embodiments, the team content identification system accesses a repository of collaborative content items from which to generate team content collections. To elaborate, the team content identification system identifies a repository collaborative content items created by user accounts within a particular organization. From the repository of collaborative content items, the team content identification system further identifies candidate collaborative content items that are eligible to be selected for inclusion within a team content collection. For instance, the team content identification system identifies, as candidate collaborative content items, those content items that are publicly accessible, that do not contain sensitive or personal information, and that are accessible by at least a threshold number of user accounts (e.g., a threshold number of non-specialized accounts). As described in further detail below, the team content identification system further filters the candidate collaborative content items (e.g., based on access patterns, sharing patterns, content activity, and/or geographic information) to select those items to include within team content collections to provide to teams of user accounts.

In some embodiments, as part of generating and providing team content collections, the team content identification system accesses and analyzes an organizational ontology. In particular, the team content identification system can identify nodes that make up the organizational ontology and that indicate teams of user accounts within an organization. Indeed, the team content identification system can identify parent nodes and child nodes that indicate relationships between teams throughout the organizational ontology. Based on the arrangement of the nodes, the team content identification system can further determine relationships between user accounts (e.g., belonging to a common team or different teams). For example, the team content identification system can identify teams to which user accounts belong and can determine links between their respective teams (or nodes) within the organization ontology. In some embodiments, the team content identification system determines relationships between user accounts utilizing additional or alternative information, such as geographic information corresponding to user accounts and/or activity data indicating common projects associated with user accounts.

To identify collaborative content items to include within a team content collection, the team content identification system can determine relationships between user accounts and collaborative content items. More specifically, in some cases, the team content identification system determines team scores for each of a number of collaborative content items. For instance, the team content identification system selects a given collaborative content item and determines measures of correspondence between the collaborative content item and each of a plurality of teams.

To determine team scores, the team content identification system can utilize a team score generation model to process data such as i) access patterns of user accounts accessing the collaborative content item, ii) sharing patterns of user accounts sharing the collaborative content item, iii) activity data indicating quantities, frequencies, and/or types of activity user accounts perform in relation to the collaborative content item, and/or iv) geographic information associated with user accounts that access the collaborative content item. In some embodiments, the team content identification system compares the team scores to select one or more teams of user accounts for providing the collaborative content item (e.g., a team with a highest score or a number of teams that satisfy a team score threshold). Additional detail regarding determining team scores and selecting collaborative content items to include within a team content collection based on team scores is provided below with reference to the figures.

Not only does the team content identification system generate a team content collection including collaborative content items relevant to user accounts belonging to a particular team, but in some embodiments the team content identification system further organizes the team content collection into sections. To elaborate, the team content identification system can analyze collaborative content items that belong to a particular team content collection to cluster or group the collaborative content items into sections with respect to one another. For instance, the team content identification system can determine a semantic meaning associated with each collaborative content item and can group the collaborative content items based on semantic meaning. In some cases, the team content identification system implements a clustering algorithm to group collaborative content items together based on distances from each other within a vector space. In certain embodiments, the team content identification system groups collaborative content items together into sections based on additional or alternative information, such as access data (e.g., by grouping more frequently accessed collaborative content items together) or other information as will be described in further detail below.

As suggested above, the team content identification system provides several advantages over existing digital content systems. For example, embodiments of team content identification systems are more flexible than existing systems. In particular, unlike existing systems that rigidly require manual curation from user accounts (e.g., specialized user accounts), the team content identification system automatically (e.g., without user interaction) curates collaborative content items. More specifically, the team content identification system determines and flexibly adapts relationships between user accounts and collaborative content items based on access of, and interaction with, collaborative content items over time. Existing systems, by contrast, require user interaction to indicate (and constantly update) which content items are germane to which user accounts.

Due at least in part to its improved flexibility, the team content identification system can more accurately identify relevant collaborative content item to provide to user accounts compared to existing digital content systems. To elaborate, the team content identification system can analyze access patterns, sharing patterns, activity data, and geographic information to determine measures of correspondence between user accounts (or teams of user accounts) and collaborative content items. Existing systems, by contrast, often fall into disarray due to disuse over time as curators fail to maintain or update relationships as changes occur within content as well as user accounts. As access of, and activity within, collaborative content items changes over time, the team content identification system can further update access patterns, sharing patterns, and other information to maintain accurate measures of correspondence between user accounts (or teams of user accounts) and collaborative content items.

In addition to improved flexibility and accuracy, embodiments of the team content identification system further improve efficiency over existing digital content systems. Particularly, whereas existing systems process large number of user interactions with manual curation of digital content, the team content identification system can reduce the number of (or eliminate) user interactions required to determine and maintain relationships between user accounts and collaborative content items. Indeed, the team content identification system can provide efficient user interfaces that require fewer user interactions to access desired data and/or functionality. For instance, the team content identification system generates (e.g., automatically or without user interaction) team content collections and provides visual representations of team content collections which are selectable to access collaborative content item relevant to a particular user account (or team of user accounts). By providing team content collections with fewer user interactions, the team content identification system consumes fewer computing resources such as processing time, processing power, and memory.

As illustrated by the foregoing discussion, the present disclosure utilizes a variety of terms to describe features and benefits of the team content identification system. Additional detail is hereafter provided regarding the meaning of these terms as used in this disclosure. As used herein, the term "collaborative content item" (or simply "content item") refers to a digital object or a digital file that includes information interpretable by a computing device (e.g., a client device) to present information to a user. A collaborative content item can include a file such as a digital document file, a digital image file, a digital audio file, a digital video file, a web file, or some other type of file or digital object. A collaborative content item can have a particular file type or file format, which may differ for different types of collaborative content items (e.g., digital documents or digital images). A collaborative content item can be editable or otherwise modifiable and can also be sharable from one user account (or client device) to another. In some cases, a collaborative content item is modifiable by multiple user accounts (or client devices) simultaneously and/or at different times.

As mentioned, the team content identification system can identify candidate collaborative content items from a repository of collaborative content item. As used herein, the term "candidate collaborative content item" refers to a content item that is eligible for inclusion within a team content collection. In some cases, a candidate collaborative content item includes a collaborative content item that is publicly accessible, that does not include personal information or sensitive information, and/or that is accessible by at least a threshold number of (non-specialized) user accounts. For example, a candidate collaborative content item can include a collaborative content item that has been previously accessed at least a threshold number of times by non-specialized user accounts and that is publicly accessible (e.g., not restricted to particular user accounts such as legal team user accounts, administrative user accounts, or executive user accounts). Additional detail about determining or identifying candidate collaborative content items is described more fully below.

Relatedly, the term "team content collection" refers to a collection of candidate collaborative content items selected for providing to a team of user accounts. In particular, a team content collection includes collaborative content items provided to a team with the highest team scores for the included collaborative content items (or with team scores that satisfy a threshold team score). In some embodiments, a team content collection includes multiple sections or groupings of collaborative content items, arranged according to subject matter, semantic meaning, recency of activity, frequency of activity, or another arrangement.

As mentioned, the team content identification system can determine team scores for various teams with respect to a particular collaborative content item. As used herein, the term "team score" refers to a score or a rating that indicates a measure of correspondence between a collaborative content item and a team of user accounts. For example, a team score includes a probability or a likelihood that a collaborative content item corresponds to a particular team of user accounts within an organization ontology. In some cases, a higher score indicates a stronger correspondence or a higher likelihood that the collaborative content item belongs to a particular team (e.g., should be included within a team content collection).

To determine a team score for a collaborative content item, in some embodiments, the team content identification system determines and processes an access pattern and/or a sharing pattern for the collaborative content item. As used herein, the term "access pattern" refers to a pattern of user accounts accessing a particular collaborative content item over a period of time. For example, an access pattern includes a historical record of user accounts previously accessing a collaborative content item and indicating the date and time of access, the user account which accessed, and from where or what device the access originated. In some cases, an access pattern is a pattern in that it repeats in the same or similar fashion over a particular period. For instance, an access pattern can include accesses at regular intervals and/or accesses in sporadic bursts with large numbers of accesses spread out in short timeframes. In certain embodiments, an access pattern indicates an access frequency or a number of times a collaborative content item is accessed over a particular time period (e.g., as an average).

In a similar sense, the term "sharing pattern" refers to a pattern of user accounts sharing a collaborative content item with one or more other user accounts. For example, a sharing pattern includes a historical record of user accounts previously sharing a collaborative content item and indicating the date and time of sharing, the user account which shared, the user accounts which received the shared collaborative content item, and where the sharing originated. In some embodiments, a sharing pattern indicates a sharing frequency for a collaborative content item, where the collaborative content item is shared a number of times over a particular time period (e.g., as an average).

In some embodiments, the team content identification system utilizes a team score generation model to generate a team score. As used herein, the term "team score generation model" refers to a machine learning model such as a neural network, a support vector machine, a decision tree, and/or a linear regression model that generates a team score to indicate correspondence between a collaborative content item and a team of user accounts. In some embodiments, a team score generation model refers to a neural network that processes input data such as an access pattern (or a sharing pattern) of a collaborative content item to generate a plurality of team scores for teams with user accounts that access (or share) the collaborative content item. The term "neural network" refers to a machine learning model that can be trained and/or tuned based on inputs to determine classifications or approximate unknown functions. For example, a neural network includes a model of interconnected artificial neurons (e.g., organized in layers) that communicate and learn to approximate complex functions and generate outputs (e.g., determinations of team scores) based on a plurality of inputs provided to the neural network. In some cases, a neural network refers to an algorithm (or set of algorithms) that implements deep learning techniques to model high-level abstractions in data.

Relatedly, the term "team" refers to a collection or a grouping of user accounts belonging to a particular node of an organizational ontology. In particular, a team includes user accounts associated with, or assigned to, a particular group or level within an organizational ontology. For example, a team can refer to a specialized team, an executive team, a programming team, a project-specific team, a staff team, a clerk team, an engineer team, or some other team. In some cases, a team is geographically based, where engineers in one geographic region (e.g., Japan) may be on a separate team from engineers in another geographic region (e.g., Germany). In one or more embodiments, a team includes user accounts within a threshold similarity of each other (e.g., based on geography, account activity, and/or accessed collaborative content items). In certain embodiments, a given team can include either specialized user accounts or non-specialized user accounts or both.

A "specialized user account" refers to a user account with special privileges and/or authorization to access restricted collaborative content items (e.g., collaborative content items that are not publicly accessible). Conversely, a "non-specialized user account" refers to a user account without special privileges and/or that cannot access restricted collaborative content items that are not publicly accessible. Thus, a collaborative content item that is "publicly accessible" is a collaborative content item that is accessible to non-specialized user accounts. In some embodiments, the team content identification system identifies a collaborative content item that includes "sensitive information," which refers to information that is restricted from access by non-specialized accounts, personal and private to a particular user account, and/or designated as sensitive by one or more user accounts.

As mentioned above, the team content identification system accesses an organizational ontology to identify, and determine relationships between, teams of user accounts. As used herein, the term "organizational ontology" refers to a stratified or hierarchical arrangement of nodes or teams within an organization. For example, an organizational ontology includes a number of nodes that represent teams of an organization arranged according to relationships between the teams. In some embodiments, an organizational ontology includes parent nodes and child nodes, where a parent node has a leadership (or managerial or oversight) relationship with respect to its one or more child nodes. In some cases, user accounts belonging to a team of a parent node receive collaborative content items provided as part of a team content collection to child nodes, but user accounts of a child node do not receive team content collections of the parent node.

As also mentioned, in some embodiments, the team content identification system determines semantic meanings associated with collaborative content items. As used herein, the term "semantic meaning" refers to a word-based or language-based meaning, subject, or topic of a collaborative content item. In particular, a semantic meaning can include a tag or a label that indicates a subject matter associated with a collaborative content item. In some embodiments, the team content identification system determines a semantic meaning utilizing a neural network (or some other natural language processing model) to label a collaborative content item based on its text. In certain cases, a semantic meaning is derived from the title of a collaborative content item, while in other cases a semantic meaning is derived from the body of the collaborative content item as well.

Additional detail regarding the team content identification system will now be provided with reference to the figures. For example, FIG. 1 illustrates a schematic diagram of an example system environment for implementing a team content identification system 102 in accordance with one or more implementations. An overview of the team content identification system 102 is described in relation to FIG. 1. Thereafter, a more detailed description of the components and processes of the team content identification system 102 is provided in relation to the subsequent figures.

As shown, the environment includes server(s) 104, client devices 108a-108n, and a network 112. Each of the components of the environment can communicate via the network 112, and the network 112 may be any suitable network over which computing devices can communicate. Example networks are discussed in more detail below in relation to FIGS. 11-12.

As mentioned, the example environment includes client devices 108a-108n. Each of the client devices 108a-108n can be one of a variety of computing devices, including a smartphone, a tablet, a smart television, a desktop computer, a laptop computer, a virtual reality device, an augmented reality device, or another computing device as described in relation to FIGS. 11-12. The client devices 108a-108n can communicate with the server(s) 104 via the network 112. For example, the client devices 108a-108n can receive user input from respective users interacting with the client devices 108a-108n (e.g., via the client application 110) to, for example, access, modify, share, or comment on digital content items and/or to interact with content item elements. In turn, the team content identification system 102 on the server(s) 104 can receive information relating to various interactions with collaborative content items and/or user interface elements based on the input received by the client devices 108a-108n (e.g., to access, edit, and/or share the collaborative content items). In some implementations, user accounts associated with particular client devices 108a-108n (or user accounts associated with a subset of the client devices 108a-108n) can belong to a particular team and have access to a common collaborative team space that includes team-specific collaborative content items.

As shown, the client devices 108a-108n can each include a client application 110. In particular, the client application 110 may be a web application, a native application installed on the client devices 108a-108n (e.g., a mobile application, a desktop application, etc.), or a cloud-based application where all or part of the functionality is performed by the server(s) 104. The client application 110 can present or display information, including a user interface such as a collaborative team space that includes elements for team-specific collaborative content items. Additionally, the client application 110 can present information in the form of collaborative content items and can facilitate user interaction with the collaborative content items to access, modify, share, and/or comment on the digital content items. Indeed, a user can interact with the client application 110 to provide user input to perform an operation as mentioned above.

As illustrated in FIG. 1, the example environment also includes the server(s) 104. The server(s) 104 may generate, track, store, process, receive, and transmit electronic data, such as collaborative content items, access patterns, sharing patterns, team scores, and team content collections. For example, the server(s) 104 may receive data from the client devices 108a-108n in the form modifications, accesses, shares, or comments of collaborative content items. In addition, the server(s) 104 can transmit data to the client devices 108a-108n in the form of updates to a collaborative team interface depicting various changes based on the modifications, accesses, shares, and comments. Indeed, the server(s) 104 can communicate with the client devices 108a-108n to send and/or receive data via the network 112. In some implementations, the server(s) 104 comprise(s) a distributed server where the server(s) 104 include(s) a number of server devices distributed across the network 112 and located in different physical locations. The server(s) 104 can comprise one or more content servers, application servers, communication servers, web-hosting servers, machine learning server, and other types of servers.

As shown in FIG. 1, the server(s) 104 can also include the team content identification system 102 as part of a content management system 106. The content management system 106 can communicate with the client devices 108a-108n to perform various functions associated with the client application 110 such as managing an organizational ontology, managing collaborative content items including team content collections (e.g., by permitting and denying access to the client devices 108a-108n based on user account permissions), synchronizing modifications, comments, shares, and other information across the client devices 108a-108n, and facilitating user interaction with the collaborative content items to modify, comment, and share the digital content items. In addition, the content management system 106 and/or the team content identification system 102 can access and utilize a team score generation model to generate team scores for teams of user accounts in relation to a particular collaborative content item. In some embodiments, the team content identification system 102 and/or the content management system utilize the database 114 to store and access information such as an organizational ontology, team content collections, collaborative content items, team scores, access patterns, sharing patterns, and other information.

Although FIG. 1 depicts the team content identification system 102 located on the server(s) 104, in some implementations, the team content identification system 102 may be implemented by (e.g., located entirely or in part) on one or more other components of the environment. For example, the team content identification system 102 may be implemented by the client devices 108a-108n and/or a third-party device.

In some implementations, though not illustrated in FIG. 1, the environment may have a different arrangement of components and/or may have a different number or set of components altogether. For example, the client devices 108a-108n may communicate directly with the team content identification system 102, bypassing the network 112. In addition, the environment can include the database 114 located external to the server(s) 104 (e.g., in communication via the network 112) or located on the server(s) 104 and/or located on the client devices 108a-108n and that stores collaborative content items. Additionally, the environment can include a team score generation model as part of the team content identification system 102, stored within the database 114, included as part of the client application 110, or housed on the server(s) 104.

Figure 2:
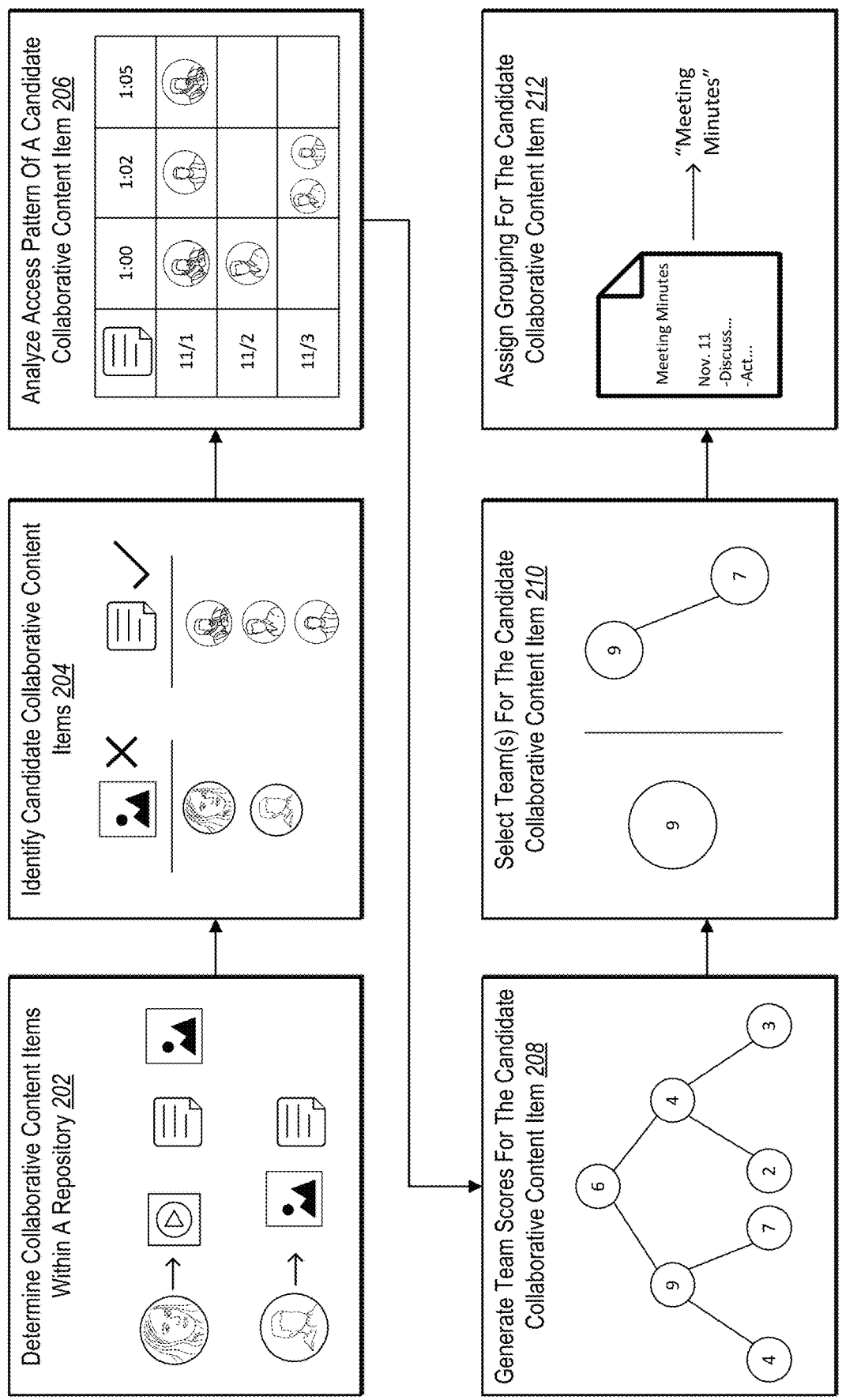
FIG. 2 illustrates an overview of generating and providing a collaborative content item within a team content collection in accordance with one or more embodiments.

As mentioned, the team content identification system 102 can generate a team content collection to provide to user accounts belonging to a particular team. In particular, the team content identification system 102 can identify and select one or more collaborative content items to include within the team content collection. FIG. 2 illustrates an example sequence of acts that the team content identification system 102 performs to assign a collaborative content item to a particular team content collection to provide to a team of user accounts in accordance with one or more embodiments. The description of FIG. 2 provides an overview of the example acts involved in selecting a team content collection (and a section within the team content collection) for a collaborative content item. Additional detail regarding the various illustrated acts is provided thereafter in relation to the subsequent figures.

As illustrated in FIG. 2, the team content identification system 102 performs an act 202 to determine collaborative content items within a repository. In particular, the team content identification system 102 obtains a corpus of collaborative content items created by user accounts associated with a particular organization (e.g., a company or some other entity). For example, the team content identification system 102 accesses a repository of collaborative content items (e.g., within the database 114) to identify those collaborative content items that were created by user accounts within a certain organizational ontology (e.g., an organization ontology associated with the company or entity). As shown, the team content identification system 102 identifies five collaborative content items, three created by a first user account, and two created by a second user account.

As further illustrated in FIG. 2, the team content identification system 102 performs an act 204 to identify candidate collaborative content items. More specifically, the team content identification system 102 selects candidate collaborative content items from among the collaborative content items within the repository associated with the organization. For example, the team content identification system 102 filters out those collaborative content items that are not eligible for inclusion within a team content collection and identifies those collaborative content items that are eligible for inclusion within a team content collection.

In some embodiments, the team content identification system 102 utilizes one or more filtering criteria for identifying candidate collaborative content items. For instance, the team content identification system 102 identifies collaborative content items that are publicly accessible (e.g., accessible to anyone or to most people within the organization). For example, the team content identification system 102 identifies collaborative content items that are open for anyone, including non-specialized user accounts, to access. In some embodiments, the team content identification system 102 removes from consideration those collaborative content items that have restricted access (e.g., as part of a legal team, an executive team, or a financial team that maintain private content) and are therefore not publicly accessible, or at least not publicly accessible to non-specialized user accounts.

In addition (or alternatively), the team content identification system 102 identifies, as candidate collaborative content items, collaborative content items that are accessible to at least a threshold number of non-specialized user accounts. Particularly, the team content identification system 102 identifies collaborative content items that non-specialized user accounts can access, view, edit, and/or share. In some cases, the team content identification system 102 identifies collaborative content items that are not only accessible to at least a threshold number of non-specialized user accounts but that have also been previously accessed by at least a threshold number of non-specialized user accounts (e.g., within a certain time period). Thus, the team content identification system 102 filters out those collaborative content items that are not accessible to, or that have not been previously accessed by, at least the threshold number of non-specialized user accounts.

In one or more embodiments, the team content identification system 102 identifies, as candidate collaborative content items, collaborative content items that do not include sensitive information. To elaborate, the team content identification system 102 analyzes or processes the collaborative content items to determine whether or not a given collaborative content item includes sensitive information. In some cases, the team content identification system 102 utilizes natural language processing, a machine learning model (e.g., a neural network), regular expressions, or other systems or methods to identify sensitive information within a collaborative content item (e.g., personal information, financial information, medical information, or other types of confidential, privileged, or otherwise sensitive information). In some cases, the team content identification system 102 identifies as sensitive only those types of information type were specifically designated by a user account as sensitive. In any event, the team content identification system 102 filters out collaborative content items that include sensitive information.

In the example of FIG. 2, the team content identification system 102 analyzes two collaborative content items. For the first collaborative content item (e.g., the digital image), the team content identification system 102 determines that the collaborative content item is accessible (or has been previously accessed) by only two user accounts. Based on a threshold of three non-specialized user accounts, for example, the team content identification system 102 determines that the digital image is not a candidate collaborative content item. For the digital document, however, the team content identification system 102 determines that the digital document is accessible (or has been previously accessed) by three non-specialized user accounts. Thus, based on this determination (and/or determinations pertaining to the lack of sensitive information and public accessibility) the team content identification system 102 determines that the digital document is a candidate collaborative content item.

As further illustrated in FIG. 2, in some embodiments, the team content identification system 102 performs an act 206 to analyze an access pattern for each candidate collaborative content item. In particular, the team content identification system 102 analyzes an access pattern that indicates dates and times of access of the candidate collaborative content item(s) by user accounts belonging to different teams of an organizational ontology. For example, the team content identification system 102 determines which user accounts access the candidate collaborative content item(s) and when such access occurs.

Based on the access pattern, the team content identification system 102 determines access frequencies with which particular user accounts (or teams) access the candidate collaborative content item(s). Additionally (or alternatively), as part of analyzing the access pattern, the team content identification system 102 determines a total number of previous accesses associated with a particular team, a recency of each access, a number of accesses for each team within a given time period, and/or any other statistical or analytical information describing the access pattern(s). As shown in FIG. 2, the team content identification system 102 determines that various user accounts accessed the digital document on 11/1, 11/2, and 11/3 at various times between 1:00 and 1:05.

Based on analyzing the access pattern, the team content identification system 102 determines a team (or teams) to which the candidate collaborative content item(s) belongs. To elaborate, in some embodiments, the team content identification system 102 performs an act 208 to generate team scores for the candidate collaborative content item(s) based at least in part on the access pattern determined in act 206. Indeed, the team content identification system 102 generates team scores to select one or more teams to receive a team content collection that includes the candidate collaborative content item(s). More specifically, the team content identification system 102 analyzes the access pattern to generate team scores for one or more teams of users based on accesses by user accounts belonging to the different teams. As shown, the team content identification system 102 generates team scores for each team within an organization ontology including seven teams. Indeed, the team content identification system 102 generates team scores for each team that accessed the candidate collaborative content item(s) to select a team to receive the candidate collaborative content item(s) (as part of a team content collection).

To generate the team scores, the team content identification system 102 utilizes a team score generation model. More particularly, the team content identification system 102 utilizes a team score generation model to generate team scores from the access pattern of the candidate collaborative content item(s). In some embodiments, the team content identification system 102 provides the access pattern as input into the team score generation model, whereupon the team score generation model generates a plurality of team scores by comparing accesses of user accounts belonging to various teams. For example, the team content identification system 102 utilizes the team score generation model to compare access frequencies, access volumes (e.g., total numbers of accesses or numbers of accesses within a given time period), and/or access recencies. In certain embodiments, the team content identification system 102 generates team scores on a scale from 0 to 1, or from 1 to 10, or from 1 to 100 (e.g., as a probability or likelihood of belonging to a particular team). In some cases, higher team scores indicate stronger measures of correspondence between a team and the candidate collaborative content item(s).

In one or more embodiments, the team content identification system 102 generates team scores based on factors other than, or in addition to, access patterns. For example, in some embodiments, the team content identification system 102 utilizes sharing patterns, geographic information, and/or user activity information pertaining to the candidate collaborative content item(s) to generate team scores for that item. Regarding sharing patterns, the team content identification system 102 determines and/or accesses a sharing pattern for the candidate collaborative content item(s) indicating numbers, frequencies, and/or recencies of instances of user accounts sharing the candidate collaborative content item(s) with other user accounts. Indeed, the team content identification system 102 determines which teams have shared the candidate collaborative content item(s) more frequently, more recently, more overall, and/or more within a particular time period.

In some embodiments, the team content identification system 102 utilizes geographic information to determine or generate team scores. For example, the team content identification system 102 determines a geographic region where the candidate collaborative content item(s) originated (e.g., a geographic region of a user account that created the collaborative content item). In addition, the team content identification system 102 determines geographic regions associated with user accounts to determine geographic relationships with the candidate collaborative content item(s). In some embodiments, the team content identification system 102 determines geographic relationships between user accounts as well. For instance, if user accounts from a team in Germany frequently access the candidate collaborative content item(s), then the team content identification system 102 determines a higher team score for other user accounts or teams in Germany (e.g., a new user account joining a team in Germany).

In certain embodiments, the team content identification system 102 utilizes activity information as part of determining or generating team scores. In particular, the team content identification system 102 determines activity and types of activity performed by user accounts with respect to the candidate collaborative content item(s). For example, the team content identification system 102 determines that a first user account accessed the candidate collaborative content item(s) but only viewed the collaborative content item, while a second user account accessed and edited the candidate collaborative content item(s). In some embodiments, the team content identification system 102 determines higher team scores for teams that perform certain types of activity (e.g., editing or modifying the candidate collaborative content item(s)) and determines lower team scores for teams that perform other types of activity (e.g., viewing the candidate collaborative content item(s)).

In one or more embodiments, the team content identification system 102 generates or determines team scores based on a combination of one or more of the above factors. Specifically, the team content identification system 102 can generate team scores from a combination (e.g., weighted combination) of an access pattern, a sharing pattern, activity information, and/or geographic information. For example, the team content identification system 102 determines and assigns weights based on a default setting (e.g., a heaviest weight for access patterns, a next-heaviest weight for sharing patterns, a third-heaviest weight for activity information, and a lightest weight for geographic information) or based on a user indication from a user account (e.g., a specialized user account or a team leader user account). Based on one or more of these factors, as shown in the example of FIG. 2, the team content identification system 102 generates team scores indicating: a "6" team score for the overall parent node team (e.g., the team that encompasses the entire organization); "9" team score and a "4" team score for the child nodes; and teams scores of "4," "7," "2," and "3" for the grandchild nodes (e.g., nodes that are in a layer of the organizational ontology below the child nodes, or that are child nodes of the other child nodes). Additional detail regarding the organizational ontology depicted by the branching tree of nodes is provided below with specific reference to FIG. 5.

As illustrated in FIG. 2, the team content identification system 102 further performs an act 210 to select team(s) for the candidate collaborative content item(s). More specifically, the team content identification system 102 determines to provide the candidate collaborative content item(s) to one or more teams from among the organizational ontology. For instance, the team content identification system 102 determines to include the candidate collaborative content item(s) within a team content collection provided to users belonging to one or more teams.

In certain embodiments, the team content identification system 102 selects a single team (or user accounts belonging to a single team) for the candidate collaborative content item(s). In particular, the team content identification system 102 identifies a team with a highest team score from among the plurality of teams within the organizational ontology as the team to receive the candidate collaborative content item(s). For example, the team content identification system 102 identifies a team with the most accesses, the most frequent accesses, the most recent accesses, the most shares, the most frequent shares, and/or the most recent shares as the team to receive the candidate collaborative content item(s) (e.g., as part of a team content collection). As an example of such a case, as shown in FIG. 2, the team content identification system 102 selects the team or node with the team score of "9," which is highest among the illustrated nodes.

In other embodiments, the team content identification system 102 selects multiple teams (or user accounts belonging to multiple teams) to receive the candidate collaborative content item(s). For example, the team content identification system 102 compares the team scores against a threshold team score. For example, the team content identification system 102 determines a threshold team score and identifies teams that satisfy the threshold team score as teams to receive the candidate collaborative content item(s) (e.g., as part of a team content collection). As shown in FIG. 2, the team content identification system 102 utilizes a threshold team score of "7" and thus selects the two nodes in the organizational ontology with team score that satisfy the threshold score (e.g., those with team scores of "9" and "7"). In some cases, the team content identification system 102 determines the threshold team score, while in other cases, the team content identification system 102 receives an indication to set the threshold team score (e.g., from a specialized user account).

In certain embodiments, the team content identification system 102 determines that no team satisfies the threshold team score for the candidate collaborative content item. In these embodiments, the team content identification system 102 determines to omit (or not provide) the candidate collaborative content item from any or all team content collections. In some cases, however, if the team content identification system 102 determines that no team satisfies the threshold team score, then the team content identification system 102 lowers the threshold team score.

In one or more embodiments, the team content identification system 102 determines that a certain team satisfies threshold team scores for a large number of candidate collaborative content items (e.g., more than a threshold number of collaborative content items). In these or other embodiments, the team content identification system 102 determines a maximum number of collaborative content items to provide to user accounts of the certain team. For example, the team content identification system 102 identifies those collaborative content items for which the team scores are highest and provides only those collaborative content items to the team, up to the maximum number.

Additionally or alternatively, the team content identification system 102 can determine that a minimum number of collaborative content items are provided to a team (or provided to each team). Thus, if a team has team scores that fail to satisfy any threshold team scores for all collaborative content items, the team content identification system 102 nevertheless provides a minimum number of collaborative content items to the team. For instance, the team content identification system 102 identifies a number of candidate collaborative content items for which the team scores highest, and the team content identification system 102 provides that number (e.g., the top 3) of collaborative content items to user accounts of the team.

As another example, the team content identification system 102 selects teams associated with a parent node of a selected node. For instance, the team content identification system 102 selects a node with a highest team score and further identifies a parent node of the highest-scoring node to receive the candidate collaborative content item(s). Indeed, in certain embodiments, user accounts associated with a parent node may need access to candidate collaborative content items of user accounts they oversee or manage (e.g., those in child nodes). Thus, the team content identification system 102 selects a team corresponding to a node that is a parent to a highest-scoring (or otherwise selected) node. In some cases, the opposite situation may be applicable, where the team content identification system 102 selects a user account of a child node of a selected parent node to receive the candidate collaborative content item(s).

As further illustrated in FIG. 2, in some embodiments, the team content identification system 102 performs an act 212 to assign a grouping for the candidate collaborative content item(s). More specifically, the team content identification system 102 determines a grouping or a section within a team content collection where the candidate collaborative content item(s) belongs. For example, the team content identification system 102 determines a semantic meaning associated with the candidate collaborative content item(s) and assigns the candidate collaborative content item(s) to a section corresponding to the semantic meaning. In some embodiments, the team content identification system 102 utilizes natural language processing or some other language-based machine learning model to determine semantic meaning from the title of the candidate collaborative content item(s) (and/or other portions such as the body of the candidate collaborative content item(s), the metadata associated with the candidate collaborative content item(s), etc.). For instance, the team content identification system 102 identifies most common words, a most commonly used set of words, and/or syntactic similarity of the words.

Indeed, in some cases, the team content identification system 102 analyzes a team content collection to cluster (e.g., via a clustering algorithm) candidate collaborative content items into groupings or sections based on semantic meaning. In addition, based on determining the semantic meaning of the new collaborative content item, the team content identification system 102 determines where to place the collaborative content item within the team content collection for providing to user accounts of the one or more selected teams. As shown, the team content identification system 102 determines a semantic meaning of "Meeting Minutes" for the candidate collaborative content item(s), and therefore includes the candidate collaborative content(s) item within a "Meeting Minutes" section of a team content collection. The team content identification system 102 thus provides the team content collection, including the candidate collaborative content item(s), to user accounts of the selected team(s).

Figure 3:
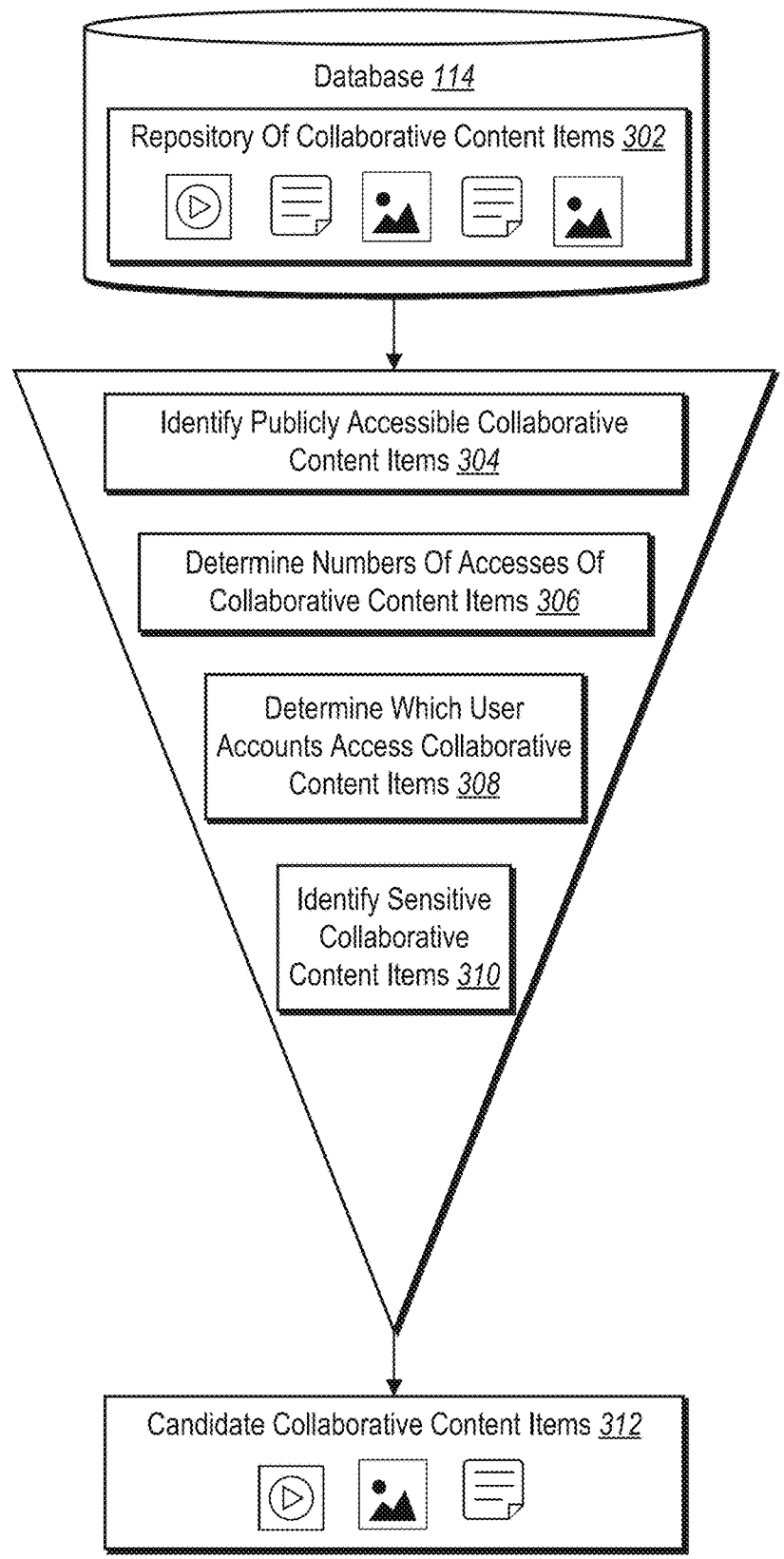
FIG. 3 illustrates generating a set of candidate collaborative content items in accordance with one or more embodiments.

As mentioned above, the team content identification system 102 can identify candidate collaborative content items. In particular, the team content identification system 102 can filter or refine a plurality of collaborative content items from a repository to identify collaborative content items that are eligible for inclusion within a team content collection. FIG. 3 illustrates filtering or identifying candidate collaborative content items based on various filtering criteria or factors in accordance with one or more embodiments.

As illustrated in FIG. 3, the team content identification system 102 accesses a repository of collaborative content items 302. In particular, the team content identification system 102 accesses the database 114 to identify the repository of collaborative content items 302 stored within the database 114. For example, the team content identification system 102 identifies collaborative content items created, generated, edited, accessed, or otherwise associated with user accounts of a particular organization. In some embodiments, the team content identification system 102 accesses an organization-specific repository of digital images that includes collaborative content items created by user accounts within a particular organizational ontology.

In addition, the team content identification system 102 filters out certain collaborative content items to identify and select a set of candidate collaborative content items from among the repository of collaborative content items 302. Specifically, the team content identification system 102 utilizes one or more determinations to identify those collaborative content items that are eligible and/or those collaborative content items that are ineligible for inclusion within a team content collection. As illustrated, the filtering process includes four acts 304-310 as factors for filtering collaborative content items. In some embodiments, the team content identification system 102 utilizes one or more of the described filtering factors (not necessarily all four) and does so in any order.

For example, the team content identification system 102 performs an act 304 to identify publicly accessible collaborative content items. Particularly, the team content identification system 102 identifies those collaborative content items that are publicly accessible from among the repository of collaborative content items 302. For instance, the team content identification system 102 determines (levels of) accessibility associated with each collaborative content item within the repository of collaborative content items 302.

Based on determining accessibility, the team content identification system 102 identifies collaborative content items that are publicly accessible and identifies collaborative content items that are not publicly accessible. Specifically, the team content identification system 102 identifies a publicly accessible collaborative content item by determining that the collaborative content item is accessible to non-specialized user accounts within an organizational ontology. Indeed, the team content identification system 102 determines that the collaborative content item is not limited to user accounts of a legal team, an executive team, a financial team, or some other set of specialized user accounts. In some embodiments, the team content identification system 102 identifies a publicly accessible collaborative content item as a collaborative content item that is accessible by at least a threshold number (e.g., three, five, or ten) of non-specialized user accounts.

As further illustrated in FIG. 3, the team content identification system 102 performs an act 306 to determine numbers of accesses of collaborative content items. In particular, the team content identification system 102 determines how many times each collaborative content item within the repository of collaborative content items 302 is, or has been previously, accessed (e.g., in total or by non-specialized user accounts only). In certain embodiments, the team content identification system 102 determines a number of accesses within a particular time period (e.g., within the past two weeks, the past six months, or the past year) or determines.

In these or other embodiments, the team content identification system 102 determines which user accounts accessed the collaborative content item. For example, the team content identification system 102 determines whether specialized user accounts or non-specialized user accounts access the collaborative content item, and how many times user accounts of each type accessed the collaborative content item. In some cases, the team content identification system 102 further identifies collaborative content items that have been accessed at least a threshold number of times (e.g., by non-specialized user accounts).

In some embodiments, the team content identification system 102 determines information other than (or in addition to) numbers of accesses. For example, the team content identification system 102 determines a recency of access for each collaborative content item and/or frequencies of access for each collaborative content item. In certain cases, the team content identification system 102 determines that collaborative content items that have been accessed within a threshold recency (e.g., the last hour, the last day, or the last month) are eligible for inclusion within a team content collection. In these or other cases, the team content identification system 102 determines that collaborative content items that have been accessed with at least a threshold frequency are eligible for inclusion within a team content collection. In one or more embodiments, the team content identification system 102 excludes from consideration those collaborative content items that have not been accessed within a threshold recency and/or with at least a threshold frequency.

As further illustrated in FIG. 3, the team content identification system 102 performs an act 308 to determine which user accounts access collaborative content items. More specifically, the team content identification system 102 determines which user accounts access which collaborative content items. For a given collaborative content item, for instance, the team content identification system 102 analyzes access information to determine which user accounts accessed the collaborative content item and when.

In some embodiments, the team content identification system 102 identifies specialized user accounts and/or non-specialized user accounts that access a collaborative content item. For example, the team content identification system 102 identifies collaborative content items that only specialized user accounts access. In addition, the team content identification system 102 identifies collaborative content items that non-specialized user accounts access (in addition or alternatively to specialized user accounts).

In certain embodiments, the team content identification system 102 determines teams associated with accessing user accounts. To elaborate, the team content identification system 102 detects an access from a first user account and another access from a second user account. The team content identification system 102 further determines a team associated with the first user account and determines another team associated with the second user account. Thus, the team content identification system 102 identifies teams of user accounts that access collaborative content items. By determining which user accounts access a collaborative content item (and when), the team content identification system 102 determines relationships between user accounts (or teams of user accounts) and the collaborative content item.

As shown in FIG. 3, the team content identification system 102 also performs an act 310 to identify sensitive collaborative content items. More particularly, the team content identification system 102 identifies those collaborative content items that contain sensitive information and/or that are designated as sensitive (e.g., by a specialized user account or a creator user account). For example, the team content identification system 102 identifies as sensitive collaborative content items associated with certain teams within an organizational ontology. Such teams include legal teams, executive teams, financial teams, and personal records teams, though not necessarily all collaborative content items associated with these teams are sensitive. In some cases, the team content identification system 102 identifies collaborative content items accessible exclusively by user accounts within one or more of these certain teams as sensitive.

In some cases, the team content identification system 102 identifies an indication (e.g., a tag or a label) designating a collaborative content item as sensitive. For example, a creator user account or a specialized user account can label a collaborative content item as sensitive to prevent the team content identification system 102 from sharing or surfacing the collaborative content item with other user accounts. In some cases, the team content identification system 102 analyzes a collaborative content item (e.g., utilizing a neural network or some other machine learning model) to determine that the collaborative content item includes sensitive information. For instance, the team content identification system 102 recognizes certain words in titles (or elsewhere) such as "private" or "sensitive" or "personal" and determines to exclude the collaborative content item from any team content collections. In some embodiments, the team content identification system 102 identifies as sensitive personal information relating to finances, addresses, or other private information.

In some embodiments, the team content identification system 102 utilizes a combination of two or more of the acts 304-310 to identify candidate collaborative content items. For example, the team content identification system 102 determines numbers (and/or frequencies and/or recencies) of access of user accounts associated with particular teams. Indeed, the team content identification system 102 determines which teams access a collaborative content item the most overall, the most within a given time period, the most recently, and/or the most frequently. In this way, the team content identification system 102 determines relationships between teams of user accounts and collaborative content items. As another example of combining more than one of the acts 304-310 together, the team content identification system 102 identifies publicly accessible collaborative content items that are also accessible (or previously accessed) by at least a threshold number of non-specialized user accounts.

As further illustrated in FIG. 3, the team content identification system 102 identifies candidate collaborative content items 312. In particular, the team content identification system 102 generates, identifies, or determines a set of candidate collaborative content items 312 from the repository of collaborative content items 302 stored within the database 114. Indeed, by utilizing the filtering process described above, including one or more of the acts 304-310, the team content identification system 102 identifies those collaborative content items that are eligible for inclusion within a team content collection. For instance, the team content identification system 102 identifies, as candidate collaborative content items, non-sensitive collaborative content items which are publicly accessible and that have been accessed by non-specialized user accounts at least a threshold number of times. In some cases, the team content identification system 102 filters out ineligible collaborative content items. In these or other cases, the team content identification system 102 further filters out collaborative content items that are designated as irrelevant by a user account (or by a threshold number of user accounts).

Figure 4A:
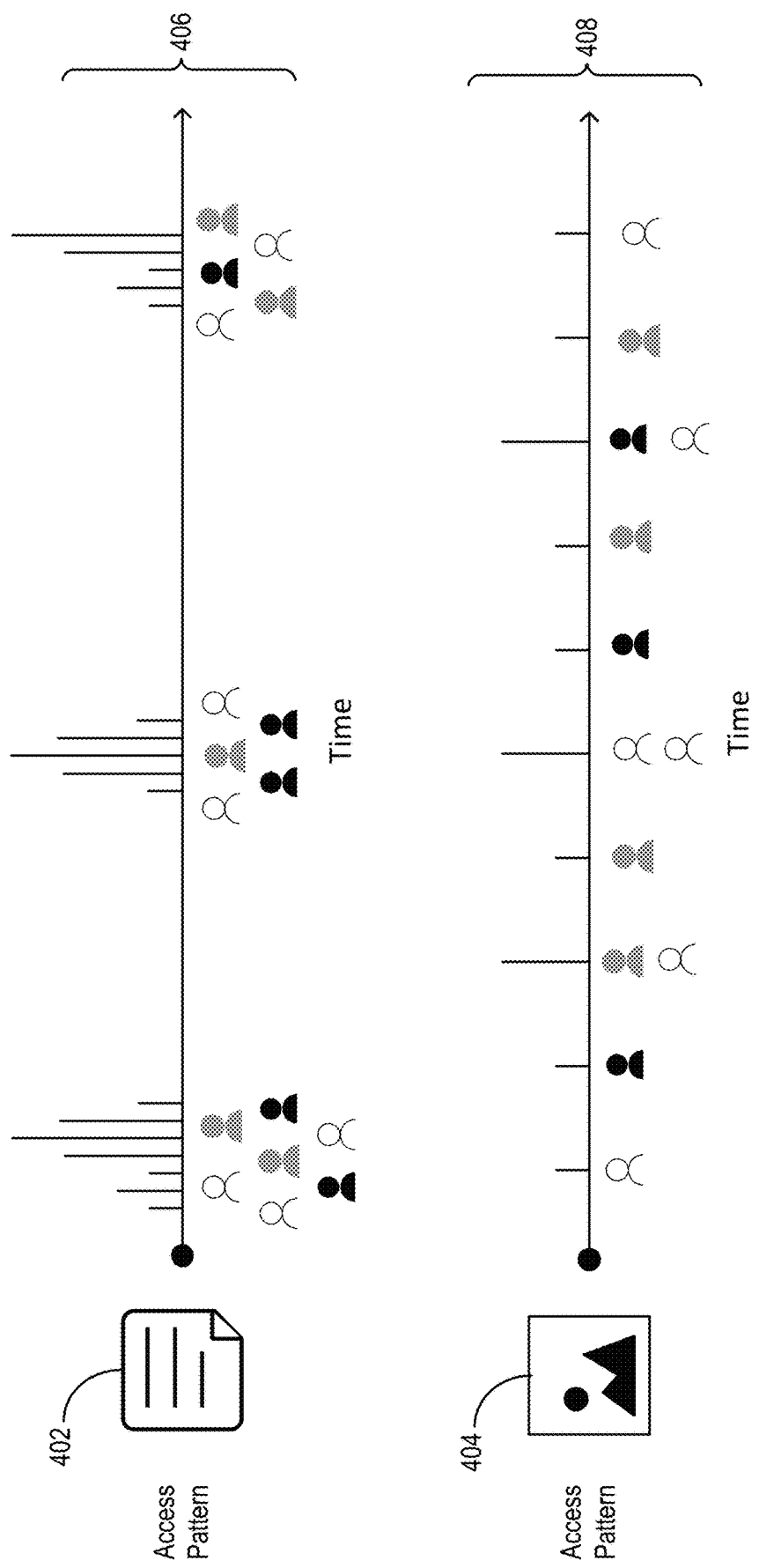
FIG. 4A illustrates identifying and analyzing access patterns of collaborative content items in accordance with one or more embodiments.

As mentioned above, the team content identification system 102 can generate or identify access patterns associated with collaborative content items. In particular, the team content identification system 102 can identify different access patterns for different collaborative content items, where each access pattern indicates a historical trend of access of a given collaborative content item. FIG. 4A illustrates an access pattern 406 corresponding to a collaborative content item 402 and an access pattern 408 corresponding to a collaborative content item 404 in accordance with one or more embodiments.

As illustrated in FIG. 4A, the team content identification system 102 identifies or generates the access pattern 406 for the collaborative content item 402. In particular, the team content identification system 102 analyzes access data or access information associated with the collaborative content item 402. From the access information, the team content identification system 102 identifies user accounts (e.g., non-specialized user accounts and/or specialized user accounts) that access the collaborative content item 402 and when the accesses occur. In some embodiments, the team content identification system 102 also determines or identifies teams associated with user accounts that access the collaborative content item 402. The team content identification system 102 thus generates the access pattern 406 that indicates times of user accounts accessing the collaborative content item 402. As shown, the access pattern 406 shows a burst-like trend of access by several user accounts in a periodic fashion, with particular heavy access time periods that are spread out with little or no access between them.

From the access pattern, the team content identification system 102 determines which team or teams are most strongly related to the collaborative content item 402. For example, the team content identification system 102 identifies those teams with user accounts that access the collaborative content item 402 the most (or the most frequently or the most recently or the most within a certain time period). Indeed, the team content identification system 102 utilizes the access pattern to determine measures of correspondence between the collaborative content item 402 and various teams of an organizational ontology based on numbers, frequencies, and/or recencies of access (e.g., a weighted combination of numbers, frequencies, and recencies).

As also illustrated in FIG. 4A, the team content identification system 102 identifies or generates the access pattern 408 for the collaborative content item 404. In particular, the team content identification system 102 analyzes access information associated with the collaborative content item 404 to identify user accounts that access the collaborative content item 404. As shown, the team content identification system 102 generates the access pattern 408 that is spread out at regular intervals (e.g., less burst-like than the access pattern 406) with different user accounts accessing the collaborative content item 404 at different times.

As mentioned above in relation to the collaborative content item 402, the team content identification system 102 also determines measures of correspondence between the collaborative content item 404 and teams of user accounts. Particularly, the team content identification system 102 utilizes the access pattern 408 to determine measures of correspondence for one or more teams based on numbers, frequencies, and/or recencies of access by user accounts belonging to the team(s). In one or more embodiments, for a given collaborative content item (e.g., the collaborative content item 404 or the collaborative content item 402), the team content identification system 102 generates team scores for teams of an organizational ontology based at least in part on an access pattern of the collaborative content item (e.g., the access pattern 408 or the access pattern 406).

In certain embodiments, the team content identification system 102 compares access patterns of different collaborative content items. For example, the team content identification system 102 compares the burst-like access pattern 406 of the collaborative content item 402 with the regular access pattern 408 of the collaborative content item 404. Based on the comparison, the team content identification system 102 identifies collaborative content items to include within, or exclude from, certain team content collections (or certain sections of a team content collection). For example, the access pattern 406 may indicate that the collaborative content item 402 belongs in a section corresponding to a particular periodic meeting where access spikes around meeting time.

Indeed, in some cases, collaborative content items that are accessed more regularly are more likely candidates for a section of a team content collection where, for example, user accounts of a team access the collaborative content item 404 regularly. However, in certain cases, the collaborative content item 402 with burst-like access pattern 410 is included within a particular section specific to a certain time-sensitive event or project, such as a section for a certain (e.g., periodic) meeting or project.

Figure 4B:
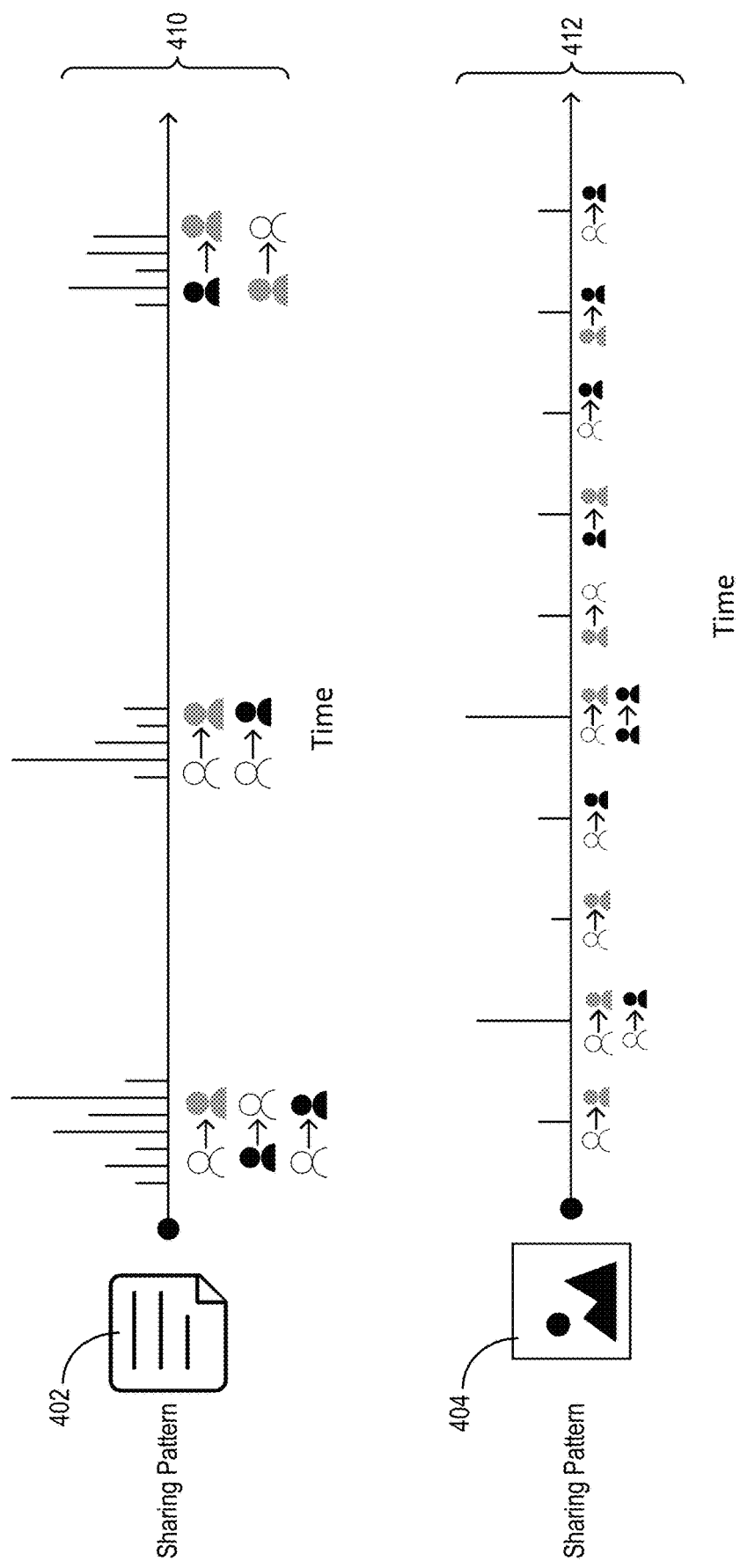
FIG. 4B illustrates identifying and analyzing sharing patterns of collaborative content items in accordance with one or more embodiments.

As further mentioned above, the team content identification system 102 can generate or identify sharing patterns associated with collaborative content items. In particular, the team content identification system 102 can generate different sharing patterns for different collaborative content items based on sharing information indicating user accounts sharing collaborative content items with other user accounts. FIG. 4B illustrates a sharing pattern 410 associated with the collaborative content item 402 and a sharing pattern 412 associated with the collaborative content item 404 in accordance with one or more embodiments.

As illustrated in FIG. 4B, the team content identification system 102 identifies or generates the sharing pattern 410 for the collaborative content item 402. In particular, the team content identification system 102 analyzes sharing information associated with the collaborative content item 402 that indicates user accounts sharing the collaborative content item 402 with other user accounts and when the sharing occurs. For example, the team content identification system 102 identifies a user account that shares the collaborative content item 402 and further identifies a user account that receives the shared collaborative content item 402.

In some embodiments, the team content identification system 102 generates the sharing pattern 410 that indicates user accounts sharing and receiving the collaborative content item 402 at particular times. As shown, the sharing pattern 410 indicates a burst-like sharing trend, with heavy sharing activity occurring sporadically over particular time periods, and where little or no sharing occurs between these time periods.

From the sharing pattern 410, the team content identification system 102 determines measures of correspondence between the collaborative content item 402 and teams of user accounts within an organizational ontology. For example, the team content identification system 102 identifies teams with user accounts that share and/or receive the collaborative content item 402 the most. In some cases, the team content identification system 102 determines teams that share the collaborative content item 402 the most within a given time period, the most frequently, and/or the most recently (or some weighted combination of the above). Thus, the team content identification system 102 determines measures of correspondence between the collaborative content item 402 and various teams, where teams that share (and/or receive) the collaborative content item 402 more (or more frequently or more recently) have a stronger measure of correspondence.

As also illustrated in FIG. 4B, the team content identification system 102 identifies or generates the sharing pattern 412 for the collaborative content item 404. In particular, the team content identification system 102 analyzes sharing information for the collaborative content item 404 to determine user accounts that share and/or receive the collaborative content item 404 and when the sharing and/or receiving occurs. As shown, the sharing pattern 412 is more regular than the sharing pattern 410, with sharing occurring at evenly spread intervals. Based on the sharing pattern 412, the team content identification system 102 determines measures of correspondence between the collaborative content item 404 and teams associated with user accounts that share and/or receive the collaborative content item 404. For instance, the team content identification system 102 determines measures of correspondence based on numbers, frequencies, and/or recencies of sharing and/or receiving the collaborative content item 404.

In some embodiments, the team content identification system 102 determines that the collaborative content item 404 is eligible for inclusion within a certain team content collection (or a certain section of a team content collection) based on the sharing pattern 412. For instance, the team content identification system 102 determines that, due to its regular sharing pattern 412, the collaborative content item 404 is a good fit for a section for a team project that has regular sharing between members of a certain team. Similarly, the team content identification system 102 determines that the collaborative content item 402 is a good candidate for a section of a team content collection corresponding to a period meeting or some other event that results in spikes in shares between user accounts of a team. In some cases, the team content identification system 102 compares the sharing pattern 410 with the sharing pattern 412 to determine which collaborative content item belongs in which team content collection or in which section of a team content collection.

Figure 5:
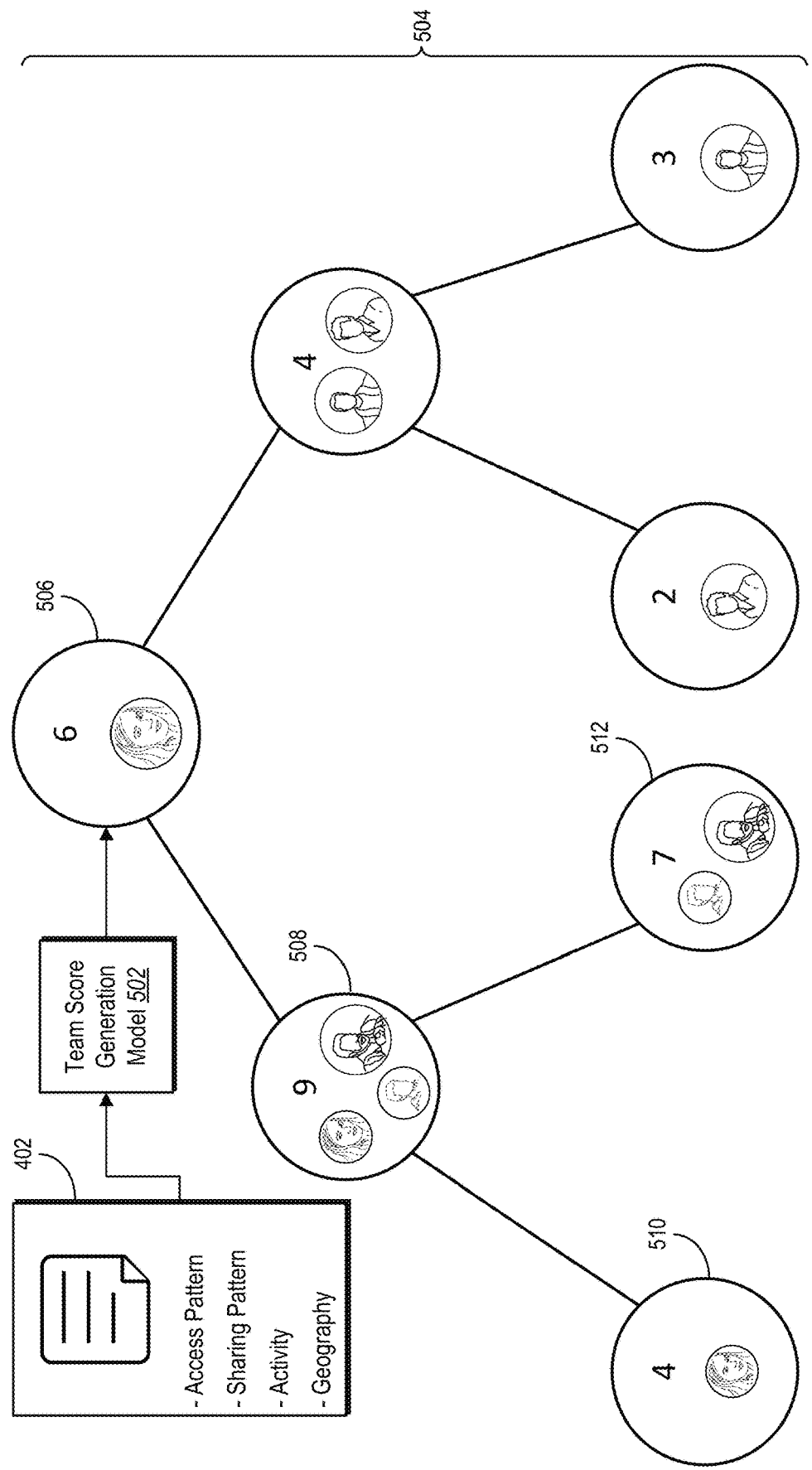
FIG. 5 illustrates generating team scores for teams of an organizational ontology in accordance with one or more embodiments.

As mentioned above, the team content identification system 102 can generate team scores that indicate measures of correspondence between a collaborative content item and a team of user accounts. In particular, for a given collaborative content item (e.g., the collaborative content item 402 or the collaborative content item 404), the team content identification system 102 can generate team scores for a plurality of teams from an organizational ontology based on an access pattern, a sharing pattern, and/or other factors as well. FIG. 5 illustrates generating team scores corresponding to the collaborative content item 402 for various teams within an organizational ontology 504 in accordance with one or more embodiments.

As illustrated in FIG. 5, the team content identification system 102 accesses an organizational ontology 504 associated with a particular organization or a particular group of teams. For example, the team content identification system 102 determines a hierarchical or stratified arrangement of teams within an organization to generate or identify the organizational ontology 504, where teams are placed in nodes indicating parent-child relationships (e.g., where a team of a parent node has some supervisory role in relation to a team of a child node). As illustrated, the node 506 is the parent of the node 508 which is the parent of the node 510 and the node 512. In some cases, a user account can belong to more than one team or node. For example, a user account can belong to multiple teams, such as those corresponding to the node 510 and to the node 508.

From the organizational ontology 504, the team content identification system 102 determines relationships between teams and/or between user accounts. For instance, the team content identification system 102 determines that the user account within the node 506 has a supervisory relationship with the other user accounts within the organizational ontology 504. In some cases, the team content identification system 102 determines that the node 506 is a specialized node or that the user account within the node 506 is a specialized user account. Indeed, the team content identification system 102 determines that user accounts within nodes higher (e.g., in layers above other nodes) in the organizational ontology 504 have specializedial or supervisory relationships in relation to user accounts in lower nodes.

As illustrated in FIG. 5, the team content identification system 102 further determines team scores for the teams within the organizational ontology 504. More specifically, the team content identification system 102 utilizes a team score generation model 502 to generate the team scores for each of the teams. As shown, the team content identification system 102 utilizes the team score generation model 502 to generate team scores in relation to the collaborative content item 402. Indeed, the team content identification system 102 utilizes the team score generation model 502 to generate team scores based on an access pattern of the collaborative content item 402, a sharing pattern of the collaborative content item 402, activity within the collaborative content item 402, and/or geographic information corresponding to the collaborative content item 402 and/or user accounts interacting with the collaborative content item 402.

As just mentioned, the team content identification system 102 generates team scores based on an access pattern. In particular, the team content identification system 102 determines numbers, frequencies, and/or recencies of access of the collaborative content item 402 associated with the teams of the organizational ontology 504. For example, the team content identification system 102 determines how many times (and how recently and how frequently) user accounts from each team access the collaborative content item 402. In some cases, the team content identification system 102 combines the accesses from user accounts of a certain team to generate the team score for the team. For instance, across user accounts for a given team, the team content identification system 102 totals a number of accesses, averages a recency of access, and/or averages a frequency of accesses of user accounts from the team to determine a team score.

In some embodiments, the team content identification system 102 weights access by different user accounts differently. For example, the team content identification system 102 identifies user accounts with viewing permission and further identifies user accounts with editing permission. In some cases, the team content identification system 102 generates higher team scores for teams with user accounts that access the collaborative content item 402 with editing permission, as compared to teams with user accounts the collaborative content item 402 with only viewing permission.

In addition (or alternatively) to utilizing an access pattern, in some cases, the team content identification system 102 utilizes a sharing pattern to determine or generate team scores. Particularly, the team content identification system 102 determines numbers, frequencies, and/or recencies of sharing the collaborative content item 402. For example, the team content identification system 102 determines how many times (and how recently and how frequently) user accounts from the various teams of the organizational ontology 504 share and/or receive the collaborative content item 402. In some cases, the team content identification system 102 combines the shares from user accounts of a certain to generate the team score for the team. For instance, the team content identification system 102 totals a number of shares, averages a recency of shares, and/or averages a frequency of shares across the user accounts of a given team to determine a team score.

Additionally, the team content identification system 102 determines activity associated with the collaborative content item 402 to generate team scores. More specifically, the team content identification system 102 determines activity performed by user accounts within, or in relation to, the collaborative content item 402. For example, the team content identification system 102 determines whether user accounts access the collaborative content item 402 to merely view the collaborative content item 402 or to edit or otherwise manipulate the collaborative content item 402. In some embodiments, in determining team scores, the team content identification system 102 weights more heavily user accounts that edit the collaborative content item 402 as compared to user accounts that merely view the collaborative content item 402.

In certain described embodiments, the team content identification system 102 utilizes geographic information to determine or generate team scores. In particular, the team content identification system 102 determines geographic information related to the collaborative content item 402 and/or to the user accounts within the organizational ontology 504. For example, the team content identification system 102 determines geographic locations (e.g., countries, states, or regions) where certain teams and/or user accounts originate. In addition, the team content identification system 102 determines a geographic location where the collaborative content item 402 originates (e.g., a geographic location of a user account that created the collaborative content item 402).

Based on the geographic information, the team content identification system 102 generates team scores for the teams of the organizational ontology 504. For instance, the team content identification system 102 identifies common geographic locations among user accounts of a given team that access, share, and/or edit the collaborative content item 402. Indeed, the team content identification system 102 generates higher team scores for teams that access the collaborative content item 402 from common geographic locations. In some cases, the team content identification system 102 generates higher team scores for teams that access the collaborative content item 402 from the same (or similar) geographic location where the collaborative content item 402 originates.

In one or more embodiments, the team content identification system 102 combines the access pattern, the sharing pattern, the activity information, and/or the geographic information to generate team scores. To elaborate, the team content identification system 102 combines the access pattern, the sharing pattern, the activity information, and/or the geographic information in a weighted combination to determine teams scores for teams of the organizational ontology. In some cases, the team content identification system 102 utilizes the team score generation model 502 to combine the access pattern, the sharing pattern, the activity information, and/or the geographic information. For instance, the team content identification system 102 utilizes the team score generation model 502 to generate predictions or likelihoods that the collaborative content item 402 belongs, or is germane, to the various teams.

As illustrated in FIG. 5, the team content identification system 102 generates a team score of 6 for the team corresponding to the node 506, a 9 for the team corresponding to the node 508, a 4 for the team corresponding to the node 510, and a 7 for the team corresponding to the node 512. Based on the illustrated team scores, the team content identification system 102 identifies one or more teams to receive a team content collection that includes the collaborative content item 402. Indeed, the team content identification system 102 generates a team content collection (including the collaborative content item 402) to provide to a highest-scoring team (e.g., corresponding to the node 508) or to teams that satisfy a threshold team score.

Figure 6A:
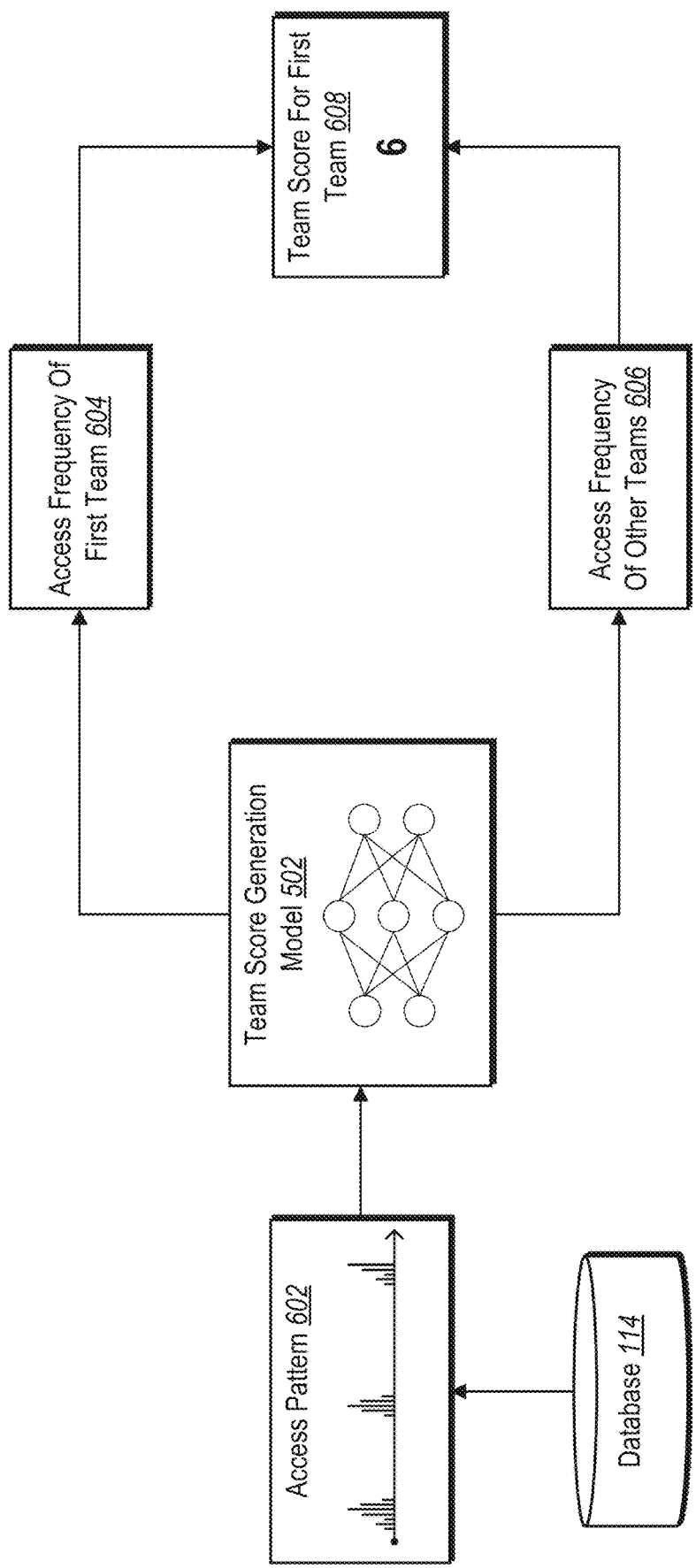
FIG. 6A illustrates utilizing a team score generation model to generate team scores for content items in accordance with one or more embodiments.

As mentioned above, the team content identification system 102 can utilize the team score generation model 502 to generate team scores. In particular the team content identification system 102 can generate team scores by inputting information into the team score generation model 502. Indeed, based on input information the team score generation model 502 generates predictions or likelihoods that various teams correspond to a collaborative content item. FIG. 6A illustrates generating a team score utilizing the team score generation model 502 in accordance with one or more embodiments.

As illustrated in FIG. 6A, the team content identification system 102 accesses an access pattern 602 from the database 114. Indeed, the team content identification system 102 identifies an access pattern 602 for a particular collaborative content item (e.g., the collaborative content item 402) stored within the database 114. In addition, the team content identification system 102 inputs the access pattern 602 into the team score generation model 502. In turn, the team score generation model 502 generates team scores for various teams based on the information within the access pattern 602.

In particular, the team content identification system 102 utilizes the team score generation model 502 to generate team scores based on comparing access frequencies indicated by the access pattern 602. For example, the team content identification system 102 utilizes the team score generation model 502 to determine an access frequency of a first team 604 from among an organizational ontology. In addition, the team content identification system 102 utilizes the team score generation model 502 to determine an access frequency of other teams 606 within the organizational ontology.

The team content identification system 102 further utilizes the team score generation model 502 to compare the access frequency of the first team 604 with the access frequency of other teams 606. Indeed, the team content identification system 102 determines a difference, or a delta, between access frequencies of the first team and other teams. In this way, the team content identification system 102 determines how frequently user accounts within the first team access the collaborative content item as compared to user accounts of other teams. From the comparison, the team content identification system 102 utilizes the team score generation model 502 to generate a team score for the first team 608. For instance, the team content identification system 102 determines that the first team accesses the collaborative content item more frequently or less frequently than the other teams (e.g., on average) and generates a team score accordingly. As shown, the team content identification system 102 generates a team score of "6" for the first team based on comparing access frequencies.

In a similar fashion, the team content identification system 102 utilizes the team score generation model 502 to generate team scores for other teams as well. In particular, the team content identification system 102 generates team scores for other teams within an organizational ontology. For example, in generating a team score for a second team, the team content identification system 102 utilizes the team score generation model 502 to determine an access frequency of the second team to compare against an access frequency of other teams (including the first team).

In this fashion, the team content identification system 102 generates a team score for each team within an organizational ontology, by comparing access frequencies of a given team against access frequencies of all other teams within the organizational ontology. In some cases, the team content identification system 102 determines higher team scores for teams with larger deltas or differences between the team's access frequency and the access frequency of other teams.

In some embodiments, the team content identification system 102 utilizes information other than (or in addition to) the access pattern 602 to input into the team score generation model 502. For example, the team content identification system 102 inputs a sharing pattern, whereupon the team score generation model 502 determines a sharing frequency of a particular team to compare against sharing frequencies of other teams in determining a team score. In some cases, the team score generation model 502 generates team scores based on activity within a given collaborative content item and/or geographic information as well.

Figure 6B:
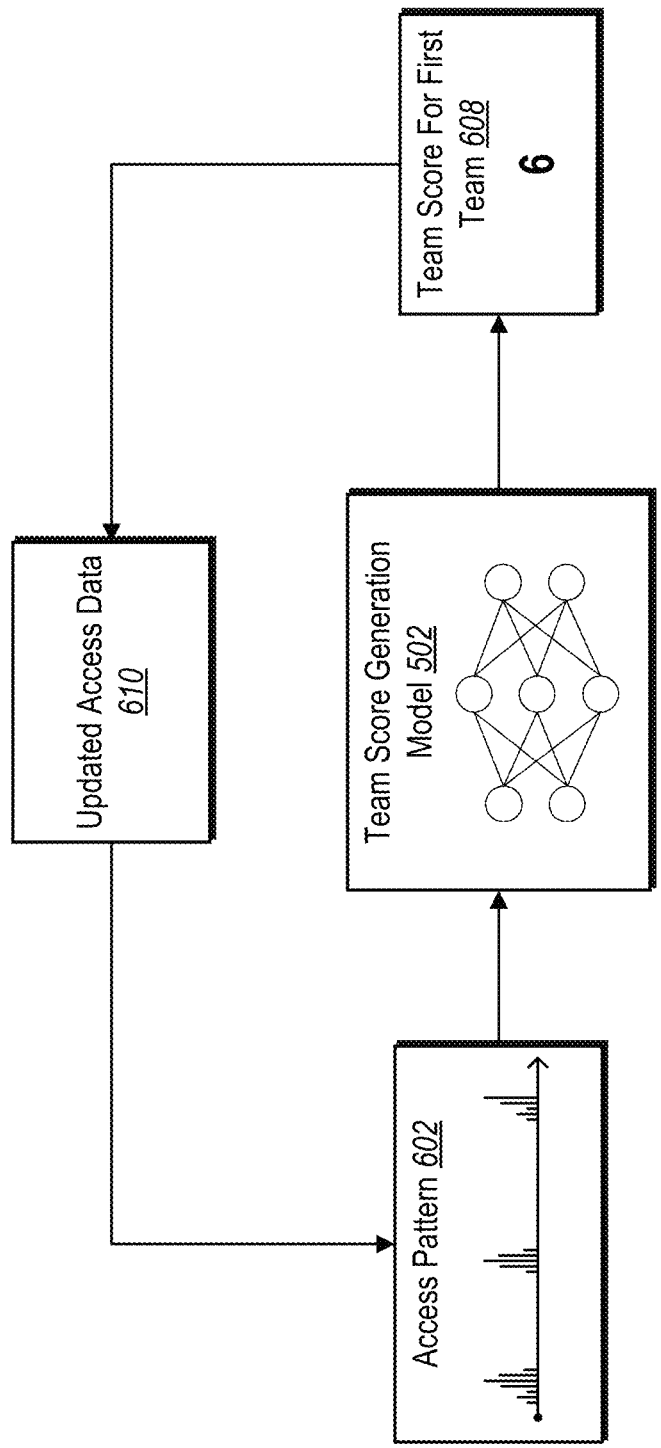
FIG. 6B illustrates updating team scores based on changes to information for content items in accordance with one or more embodiments.

As mentioned, the team content identification system 102 can modify or update team scores based on new or updated information. In particular, the team content identification system 102 can detect or identify changes to collaborative content item information such as access information, sharing information, activity information, and/or geographical information. FIG. 6B illustrates updating a team score based on changes or updates to information for a collaborative content item in accordance with one or more embodiments.

As illustrated in FIG. 6B, the team content identification system 102 the team content identification system 102 inputs the access pattern 602 into the team score generation model 502. In turn, the team score generation model 502 generates the team score for the first team 608, as described above. Additionally, the team content identification system 102 identifies, receives, or detects updated access data 610. More specifically, the team content identification system 102 continuously monitors the collaborative content item and tracks accesses (and shares and activities) of the collaborative content item.

Upon detecting a new access (or upon detecting a threshold number of new accesses), the team content identification system 102 identifies the updated access data 610 that indicates the new access of the collaborative content item by a particular user account. In addition, the team content identification system 102 modifies or updates the access pattern 602 to incorporate the new access. Further, the team content identification system 102 inputs the modified access pattern into the team score generation model 502, whereupon the team score generation model 502 generates updated team scores (e.g., for each team within an organizational ontology). In some embodiments, the team content identification system 102 determines the updated access data 610 based on a threshold amount of time elapsing. For instance, the team content identification system 102 periodically checks for new access information at regular intervals (e.g., hourly, daily, or weekly).

In certain embodiments, the team content identification system 102 updates sharing information. For example, the team content identification system 102 detects a new instance (or a threshold number of new instances) of one or more user accounts sharing a collaborative content item. In some cases, the team content identification system 102 periodically checks for new sharing information at regular intervals. Upon detecting new sharing information, the team content identification system 102 updates or modifies a sharing pattern for the collaborative content item, inputs the modified sharing pattern into the team score generation model 502, and generates updated team scores.

In one or more embodiments, the team content identification system 102 updates activity information (e.g., in addition to access information and sharing information). For example, the team content identification system 102 detects a new instance (or a threshold number of new instances) of one or more user accounts editing a collaborative content item. In some cases, the team content identification system 102 periodically checks for new activity information at regular intervals. Upon detecting new activity information, the team content identification system 102 inputs the modified activity information into the team score generation model 502 and generates updated team scores.

As a result of updating team scores, the team content identification system 102 can update which team(s) receive a team content collection including a particular collaborative content item. For example, the team content identification system 102 includes the collaborative content item within a team content collection provided to a first team based on initial team scores. As accesses, shares, and activity changes over time, however, the team content identification system 102 updates the team scores and determines to include the collaborative content item within a team content collection provided to a second team instead. In some cases, the team content identification system 102 thus removes or revokes the collaborative content item from team content collection provided to the first team.

In some embodiments, the team content identification system 102 trains, or learns parameters for, the team score generation model 502. For example, the team content identification system 102 learns parameters for the team score generation model 502 that result in accurate team scores. To train the team score generation model 502, the team content identification system 102 utilizes a set of training data or sample data. In particular, the team content identification system 102 inputs a sample access pattern (or a sample sharing pattern) into the team score generation model 502, whereupon the team score generation model 502 generates a predicted team score.

In addition, the team content identification system 102 compares the predicted team score with a ground truth team score (e.g., a ground truth team score that is associated with the sample pattern). For instance, the team content identification system 102 utilizes a loss function to determine an error or a measure of loss associated with the team score generation model 502 that reflect the discrepancy between the predicted team score and the ground truth team score. Further, the team content identification system 102 back propagates to modify parameters of the team score generation model 502. For example, the team content identification system 102 modifies weights or parameters associated with various layers and/or neurons of the team score generation model 502 to reduce or minimize the measure of loss.

The team content identification system 102 can repeat this process of inputting sample patterns, generating predicted team scores, comparing the predicted team scores with ground truth team scores, and modifying parameters for many iterations or epochs. Over many iterations, the team content identification system 102 continues to modify the parameters until the team score generation model 502 generates accurate team scores (e.g., where the error satisfies a threshold measure of error).

In one or more embodiments, the team content identification system 102 updates parameters for the team score generation model 502 based on user input. For example, as user accounts interact with collaborative content items by adding collaborative content items to team content collections, removing collaborative content items from team content collections, sharing collaborative content items, accessing collaborative content items, and/or performing other actions, the team content identification system 102 adjusts parameters for the team score generation model 502. In some cases, the team content identification system 102 modifies the parameters to learn which user actions indicate higher degrees of relevance (and therefore higher team scores) and which user actions indicate lower degrees of relevance (and therefore lower team scores). For instance, the team content identification system 102 modifies parameters to cause the team score generation model 502 to generate lower team scores for teams that remove collaborative content items from team content collections. As another example, the team content identification system 102 modifies parameters to generate higher team scores for teams that add, share, and/or access collaborative content items.

Figure 7:
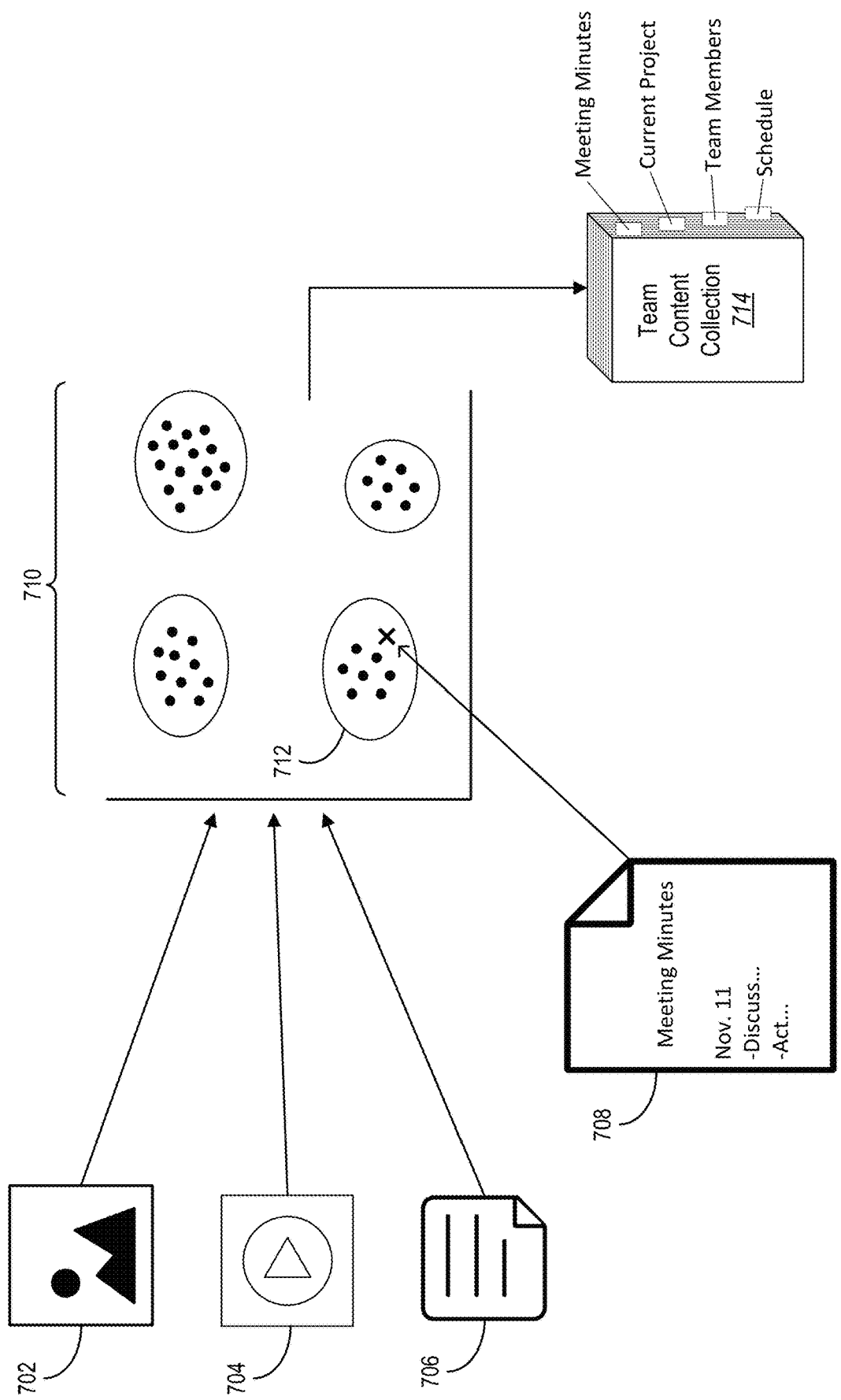
FIG. 7 illustrates grouping collaborative content items within a team content collection based on semantic meaning in accordance with one or more embodiments.

As mentioned above, the team content identification system 102 can include a collaborative content item within a team content collection provided to a team of user accounts. In particular, the team content identification system 102 can includes the collaborative content item within a particular section of a team content collection. FIG. 7 illustrates determining a section of a team content collection for a collaborative content item in accordance with one or more embodiments.

As illustrated in FIG. 7, the team content identification system 102 determines sections for each collaborative content item included within the team content collection 714. To elaborate, the team content identification system 102 segments, partitions, or clusters the collaborative content items within the team content collection 714 into various sections. As shown, the team content identification system 102 determines four sections for the team content collection 714: i) "Meeting Minutes," ii) "Current Project," iii) "Team Members," and iv) "Schedule."

In some embodiments, the team content identification system 102 determines the different sections based on semantic meanings associated with different collaborative content items. In particular, the team content identification system 102 analyzes the collaborative content item 702, the collaborative content item 704, the collaborative content item 706, and the collaborative content item 708 to determine semantic meanings for each one.

For instance, the team content identification system 102 utilizes natural language processing and/or a neural network to determine semantic meanings for collaborative content items. Specifically, the team content identification system 102 analyzes content within a collaborative content item to determine its semantic meaning. For the collaborative content item 702, for instance, the team content identification system 102 analyzes the digital image to classify, or determine a semantic label for, any objects or scenes depicted in the digital image. For the collaborative content item 704, the team content identification system 102 analyzes the digital video to classify any objects or scenes within the digital video. Further, for the collaborative content item 706, the team content identification system 102 analyzes the text of the digital document to determine its semantic meaning. In some cases, the team content identification system 102 determines a semantic meaning from a title of a collaborative content item. In other cases, the team content identification system 102 utilizes other portions of content in addition to (or alternatively) to the title. In these or other cases, the team content identification system 102 clusters collaborative content items based on type, where digital images are in one section, digital videos are in another section, a first type of digital document (e.g., a spreadsheet) is in yet another section, and a second type of digital document (e.g., a text editing document) is in a further section.

In one or more embodiments, the team content identification system 102 determines clusters or groups of collaborative content items within a team content collection based on their semantic meaning. For example, the team content identification system 102 determines that the collaborative content item 702, the collaborative content item 704, and the collaborative content item 706 all belong to the team content collection 714. In addition, the team content identification system 102 utilizes a clustering algorithm (e.g., a nearest neighbor algorithm) to group collaborative content items into sections. For instance, the team content identification system 102 utilizes a neural network to generate vector representations of the collaborative content items (or vector representations of the semantic meanings) and utilizes a clustering algorithm to cluster the vector representations within a vector space 710.

As illustrated in FIG. 7, the team content identification system 102 clusters vector representations of the collaborative content item 702, the collaborative content item 704, the collaborative content item 706, and other collaborative content items. In particular, the team content identification system 102 determines distances between the vector representations within the vector space 710 and groups the vectors into clusters such as the cluster 712 based on the distances (e.g., where the distances represent measures of similarity between collaborative content items). In some embodiments, each cluster within the vector space 710 represents a different section within the team content collection 714.

Upon analyzing a new collaborative content item to include within the team content collection 714, such as the collaborative content item 708, the team content identification system 102 determines a semantic meaning for the collaborative content item 708 (e.g., "Meeting Minutes"). From the semantic meaning, the team content identification system 102 generates a vector representation for the collaborative content item 708 and determines distances from the vector representation to other vector representations within the vector space 710. As shown, the team content identification system 102 groups the collaborative content item 708 into the cluster 712, which corresponds to the section "Meeting Minutes." Thus, the team content identification system 102 includes the collaborative content item 708 in the "Meeting Minutes" section and provides the team content collection 714 to a team (or teams) of user accounts (based on team scores).

Figure 8A:
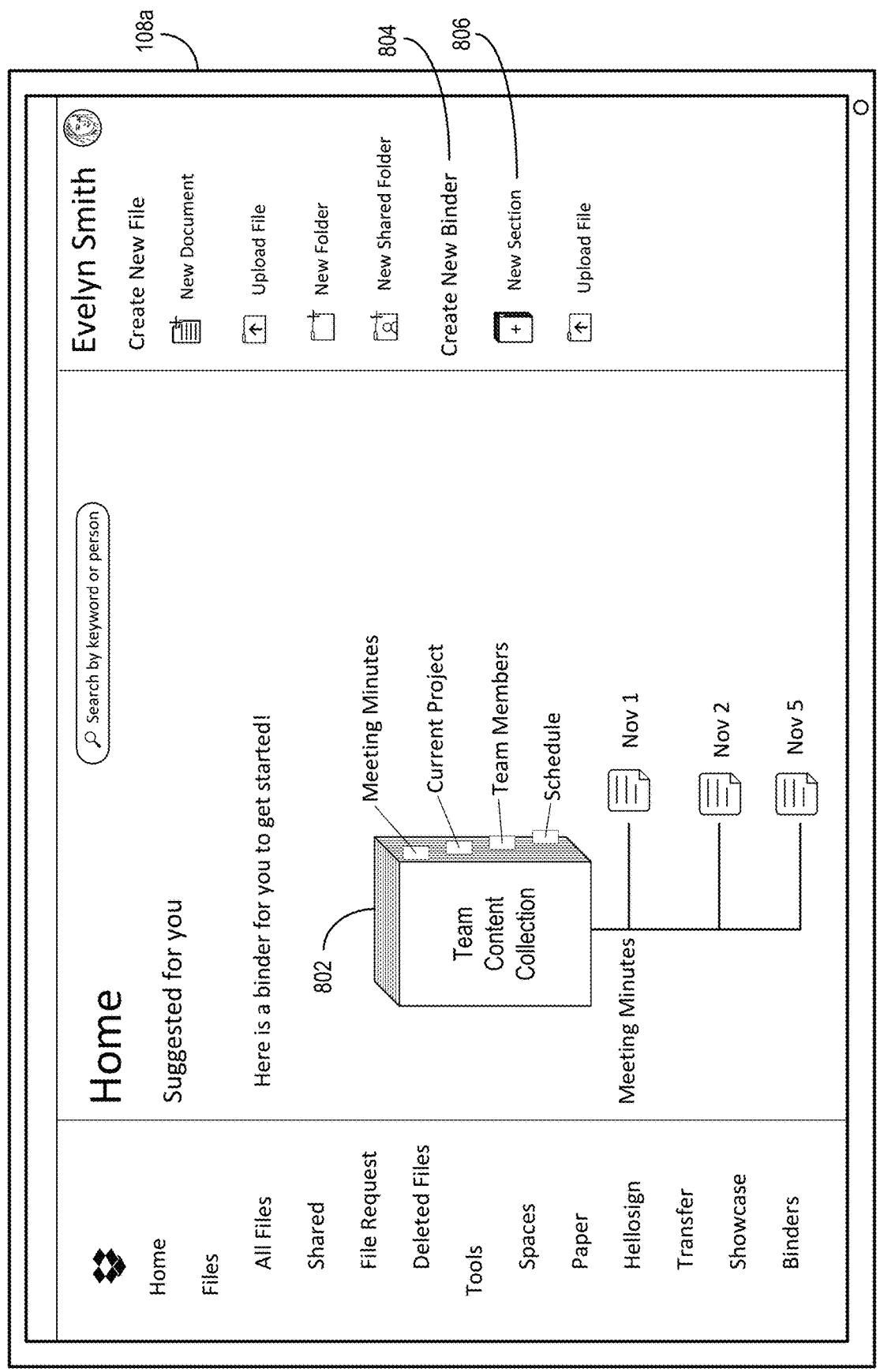
FIG. 8A illustrates an example team content collection interface in accordance with one or more embodiments.

As mentioned above, the team content identification system 102 can generate and provide a team content collection interface. In particular, the team content identification system 102 can present, or cause a client device (e.g., the client device 108a and/or the client device 108n) to present, a team content collection interface that includes a team content collection and various interface elements for interacting with the team content collection. FIG. 8A illustrates the client device 108a displaying a team content collection interface in accordance with one or more embodiments.

As illustrated in FIG. 8A, the team content collection interface includes a team content collection element 802 that is selectable to view different sections within the team content collection (e.g., the team content collection 714). In some embodiments, each separate section of a team content collection is selectable. For example, upon receiving user interaction selecting a particular section (e.g., "Meeting Minutes"), the team content identification system 102 causes the client device 108a to display collaborative content items within the selected section. As shown, the team content collection interface includes three different "Meeting Minutes" collaborative content items, for "Nov 1," "Nov 2," and "Nov 3."

As also illustrated in FIG. 8A, the team content collection interface includes a create new binder element 804 selectable to create a new team content collection. For instance, the team content identification system 102 receives an indication of user interaction with the create new binder element 804 and guides a user through a new binder creation wizard in response. In some cases, the team content identification system 102 asks the user to identify user accounts, teams, and/or collaborative content items to include within the team content collection.

Additionally, the team content collection interface includes a new section element 806 selectable to create a new section with a current team content collection. More specifically, the team content identification system 102 receives user interaction with the new section element 806 and generates a new section within the current team content collection. For example, the team content identification system 102 prompts a user to indicate a semantic meaning associated with the new section and further identifies other collaborative content items with similar semantic meanings to include within the new section.

Figure 8B:
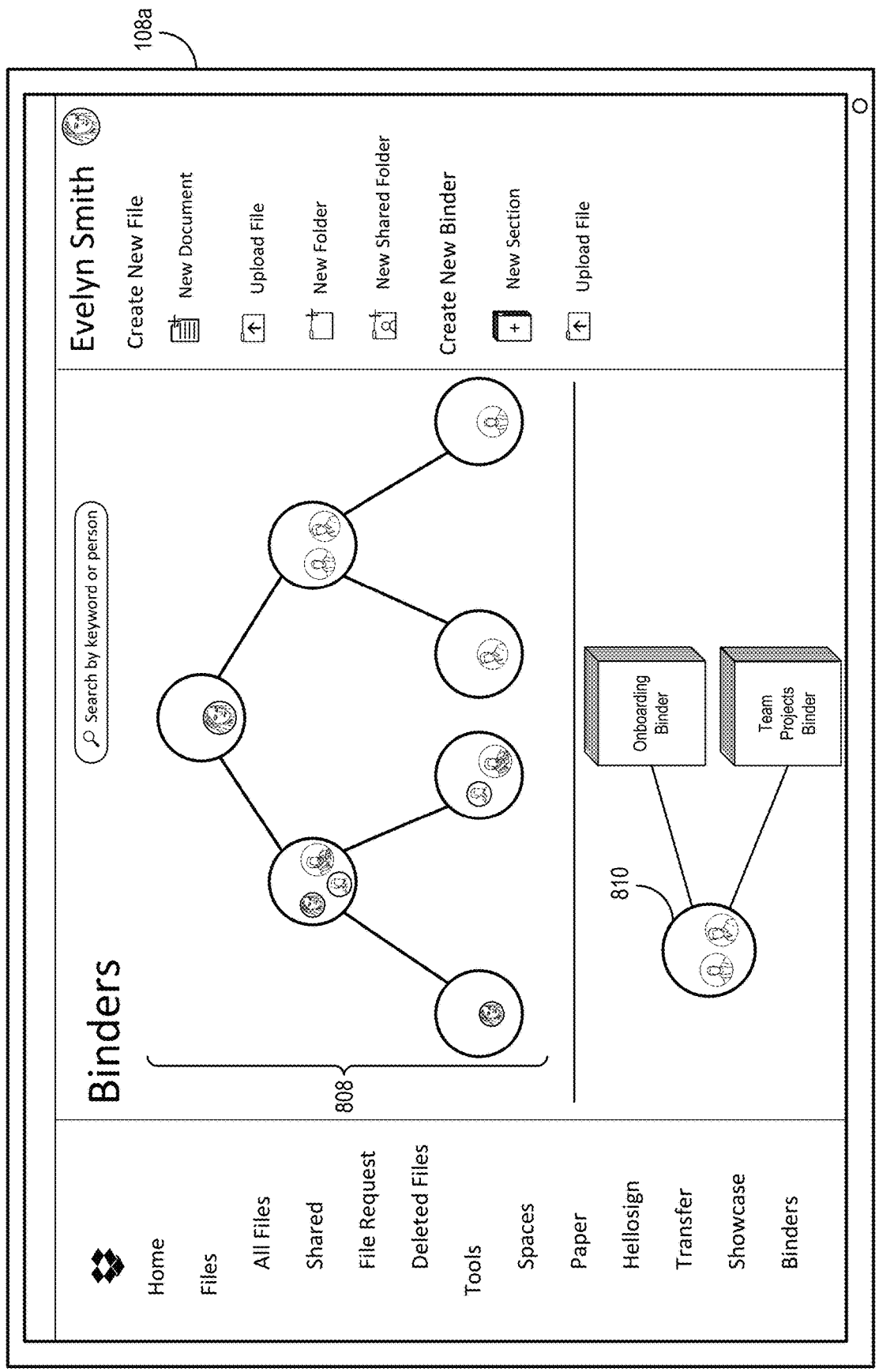
FIG. 8B illustrates an example organizational ontology interface in accordance with one or more embodiments.

In one or more embodiments, the team content identification system 102 provides additional or alternative user interfaces. For example, the team content identification system 102 provides an organizational ontology interface for navigating among teams and corresponding team content collections of an organizational ontology. FIG. 8B illustrates an organizational ontology interface in accordance with one or more embodiments.

As illustrated in FIG. 8B, the client device 108a displays an organizational ontology interface that includes a visual representation of an organizational ontology 808. The team content identification system 102 receives indications of user interaction selecting a node (e.g., the node 810) from among the nodes of the organizational ontology 808. In response, the team content identification system 102 causes the client device 108a to display the selected node 810 and any team content collections associated with the selected node. Based on user interaction selecting a team content collection, the team content identification system 102 provides a team content collection interface, as described above in relation to FIG. 8A. In some embodiments, the team content identification system 102 provides the organizational ontology interface only to specialized user accounts. For instance, the team content identification system 102 provides a portion of an organizational ontology that includes a node of the specialized user account and any nodes branching from the node of the specialized user account (e.g., those nodes that the specialized user account has permission to access).

In certain embodiments, the team content identification system 102 generates and provides recommendations or suggestions to create a new team content collection and/or a new section within a team content collection. To elaborate, the team content identification system 102 identifies particular user accounts accessing certain collaborative content items, and rather than automatically generating a team content collection, the team content identification system 102 provides suggestions to generate a team content collection specific to a particular team or currently accessed collaborative content item. FIG. 8C illustrates a collaborative team space interface including a new team content collection suggestion 812 and a new section suggestion 814 in accordance with one or more embodiments.

As illustrated in FIG. 8C, the client device 108a displays a collaborative team space interface for "Project Athos." Within the interface, a user can access various collaborative content item in folders for Project Athos. The team content identification system 102 enables multiple user accounts within a team to access the same collaborative team space interface to access and edit collaborative content items for Project Athos.

In some cases, the team content identification system 102 determines that at least a threshold number of user accounts access Project Athos, that at least a threshold number of accesses of collaborative content items within Project Athos have occurred, and/or that Project Athos includes at least a threshold number of collaborative content items. Based on one or more of these determinations, the team content identification system 102 generates and provides the project-specific new team content collection suggestion 812 for display. In some cases, the team content identification system 102 provides the new team content collection suggestion 812 to a specialized user account within Project Athos to create a team content collection.

As further illustrated in FIG. 8C, the client device 108a displays the new section suggestion 814. In particular, the team content identification system 102 causes the client device 108a to display the new section suggestion 814 within the collaborative team space interface. In some embodiments, the team content identification system 102 analyzes a set of collaborative content items within Project Athos to determine semantic meanings. In addition, the team content identification system 102 determines that the collaborative content items belong in a common section within a team content collection. Thus, the team content identification system 102 generates and provides the new section suggestion 814 for display.

As shown, the team content identification system 102 determines (e.g., from the titles) that the digital documents "Coding Tips and Tricks," "How to Program with Our Team," and "Rules for Coding" all share a semantic meaning of "Coding Rules." Thus, the team content identification system 102 generates the new section suggestion 814 to suggest creating a section for "Coding Rules" within a team content collection.

Additionally, the team content identification system 102 determines to provide a team content collection to particular user accounts belonging to teams with certain team scores. For example, the team content identification system 102 identifies a new user account (e.g., a user account onboarding to a team working on Project Athos) and provides a team content collection to the new user account. Specifically, the team content identification system 102 identifies collaborative content items to include within a team content collection by generating team scores for collaborative content items, as described. For instance, based on team scores for collaborative content items within Project Athos, the team content identification system 102 determines to provide a team content collection to the new user account.

Figure 9:
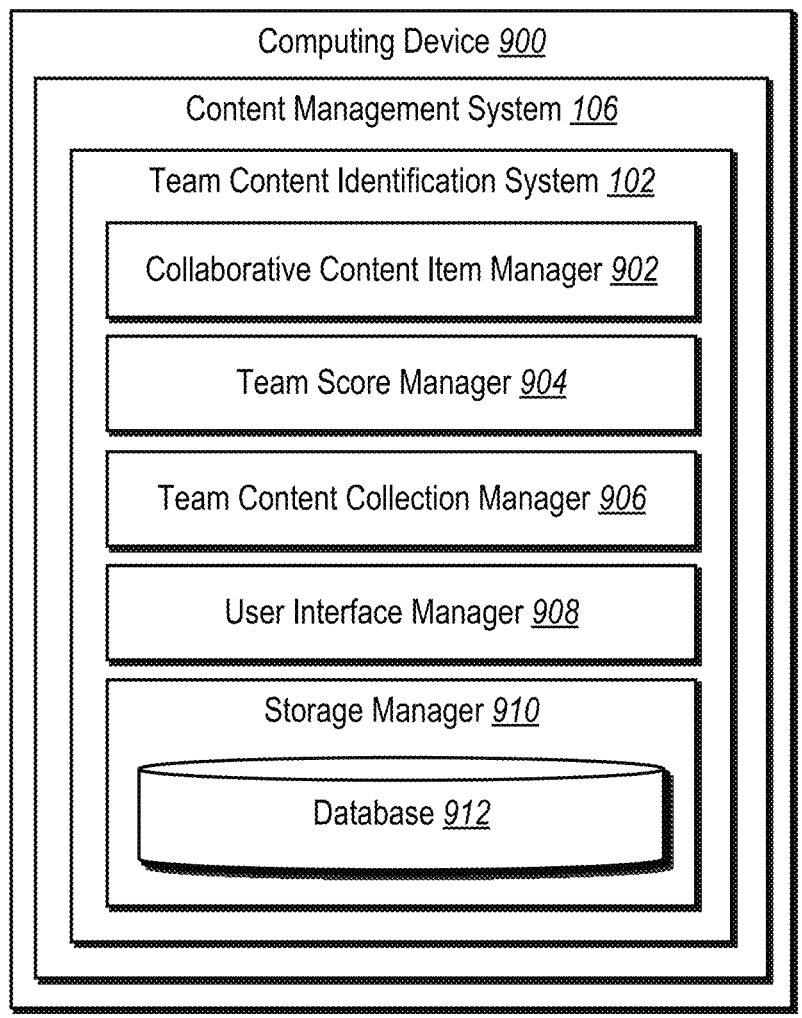
FIG. 9 illustrates a schematic diagram of a team content identification system in accordance with one or more embodiments.

Looking now to FIG. 9, additional detail will be provided regarding components and capabilities of the team content identification system 102. Specifically, FIG. 9 illustrates an example schematic diagram of the team content identification system 102 on an example computing device 900 (e.g., one or more of the client devices 108a-108n and/or the server(s) 104). As shown in FIG. 9, the team content identification system 102 may include a collaborative content item manager 902, a team score manager 904, a team content collection manager 906, a user interface manager 908, and a storage manager 910. The storage manager 910 can operate in conjunction with one or more memory devices (e.g., the database 912) that store various data such as a repository of collaborative content items, user accounts, a team score generation model, and/or other information.

As just mentioned, the team content identification system 102 includes a collaborative content item manager 902. In particular, the collaborative content item manager 902 manages, maintains, accesses, stores, detects, determines, generates, provides, and/or identifies collaborative content items. For example, the collaborative content item manager 902 manages collaborative content items for an organization, storing and distributing collaborative content items among user accounts for collaboration, sharing, viewing, and editing. In addition, the collaborative content item manager 902 identifies candidate collaborative content items that are eligible for inclusion within a team content collection. Specifically, the collaborative content item manager 902 filters out ineligible collaborative content items and identifies collaborative content items that are publicly accessible, have been accessed by non-manager at least a threshold number of times, and/or that do not include sensitive information.

As illustrated, the team content identification system 102 also includes a team score manager 904. In particular, the team score manager 904 manages, determines, maintains, generates, or identifies team scores for teams of user accounts within an organizational ontology. For example, the team score manager 904 utilizes a team score generation model to generate team scores associated with a collaborative content item. The team score manager 904 generates team scores based on access data, sharing data, activity data, and/or geographic data. Based on the team scores, the team score manager 904 identifies one or more teams for providing a team content collection.

Indeed, the team content identification system 102 further includes a team content collection manager 906. In particular, the team content collection manager 906 manages, maintains, generates, determines, provides, distributes, or identifies team content collections. For example, the team content collection manager 906 selects a team to receive a team content collection including one or more collaborative content items. In some embodiments, the team content collection manager 906 selects collaborative content items to include within a team content collection based on team scores and further groups collaborative content items into sections within a team content collection.

As further illustrated in FIG. 9, the team content identification system 102 includes a user interface manager 908. In particular, the user interface manager 908 manages, maintains, provides, presents, displays, or causes a client device to present or display one or more user interfaces. For example, the user interface manager 908 provides a team content collection interface, a collaborative team space interface, and/or an organizational ontology interface, as described above. In addition, the user interface manager 908 receives indications of user interaction with one or more selectable elements within user interfaces and communicates with the other components of the team content identification system 102 to perform functions described herein.

As shown, the team content identification system 102 further includes a storage manager 910. The storage manager 910 operates in conjunction with or include one or more memory devices such as the database 912 (e.g., the database 114) that store various data such as a repository of digital content items and digital content editing operations. The storage manager 910 (e.g., via a non-transitory computer memory/one or more memory devices) stores and maintains data associated with managing, maintaining, organizing, and providing collaborative content items, determining team scores, and generating team content collections (e.g., within the database 912). In some cases, the database 912 stores a repository of collaborative content items and a team score generation model.

In one or more implementations, each of the components of the team content identification system 102 are in communication with one another using any suitable communication technologies. Additionally, the components of the team content identification system 102 can be in communication with one or more other devices including one or more client devices described above. It will be recognized that although the components of the team content identification system 102 are shown to be separate in FIG. 9, any of the subcomponents may be combined into fewer components, such as into a single component, or divided into more components as may serve a particular implementation. Furthermore, although the components of FIG. 9 are described in connection with the team content identification system 102, at least some of the components for performing operations in conjunction with the team content identification system 102 described herein may be implemented on other devices within the environment.

The components of the team content identification system 102 can include software, hardware, or both. For example, the components of the team content identification system 102 can include one or more instructions stored on a computer-readable storage medium and executable by processors of one or more computing devices (e.g., the computing device 900). When executed by one or more processors, the computer-executable instructions of the team content identification system 102 can cause the computing device 900 to perform the methods described herein. Alternatively, the components of the team content identification system 102 can comprise hardware, such as a special purpose processing device to perform a certain function or group of functions. Additionally or alternatively, the components of the team content identification system 102 can include a combination of computer-executable instructions and hardware.

Furthermore, the components of the team content identification system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the team content identification system 102 may be implemented as part of a stand-alone application on a personal computing device or a mobile device.

FIGS. 1-9, the corresponding text, and the examples provide a number of different systems and methods for generating and providing team content collections including relevant collaborative content items to teams of user accounts. In addition to the foregoing, implementations can also be described in terms of flowcharts comprising acts steps in a method for accomplishing a particular result. For example, FIG. 10 illustrates a series of acts 1000 for generating and providing team content collections including relevant collaborative content items to teams of user accounts.

Figure 10:
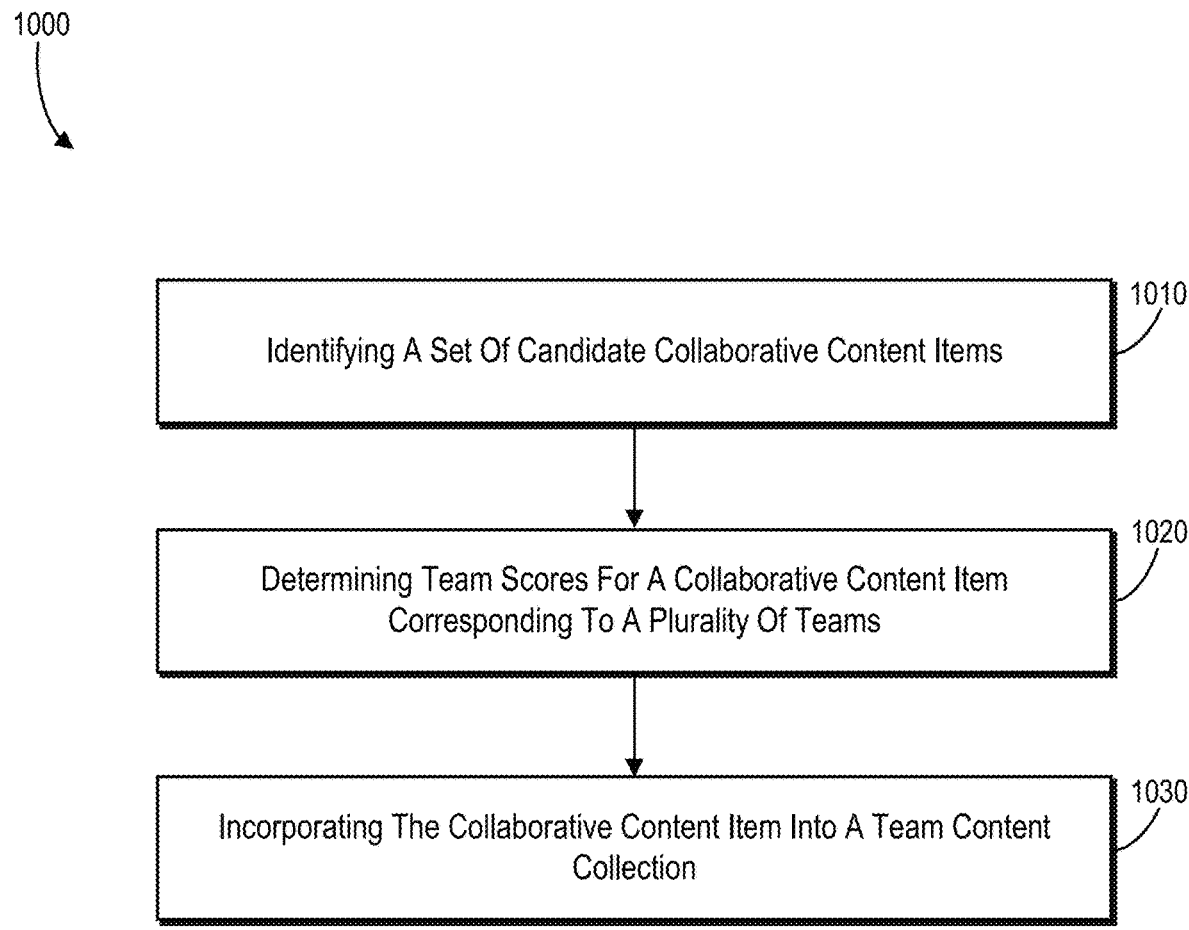
FIG. 10 illustrates a flowchart of a series of acts of generating and providing a team content collection including collaborative content items based on team scores in accordance with one or more embodiments.

While FIG. 10 illustrates acts according to one implementation, alternative implementations may omit, add to, reorder, and/or modify any of the acts shown in FIG. 10. The acts of FIG. 10 can be performed as part of a method. Alternatively, a non-transitory computer readable medium can comprise instructions, that when executed by one or more processors, cause a computing device to perform the acts of FIG. 10. In still further implementations, a system can perform the acts of FIG. 10.

As illustrated in FIG. 10, series of acts 1000 may include act 1010 of identifying a set of candidate collaborative content items. In particular, the act 1010 involves identifying, from a repository of collaborative content items, a set of candidate collaborative content items accessible to user accounts associated with an organizational ontology indicating relationships between a plurality of teams of user accounts. For example, the act 1010 involves selecting, from the repository of collaborative content items, collaborative content items that are publicly accessible and that have been accessed by at least a threshold number of non-specialized user accounts. In some cases, the act 1010 involves excluding, from the set of candidate collaborative content items, collaborative content items that are not publicly accessible, that have not been accessed by at least the threshold number of non-specialized user accounts, or that include sensitive information.

As shown, the series of acts 1000 also includes an act 1020 of determining team scores for a collaborative content item corresponding to a plurality of teams. In particular, the act 1020 involves determining, for a collaborative content item within the set of candidate collaborative content items and utilizing a team score generation model, team scores corresponding to the plurality of teams within the organizational ontology. For example, the act 1020 involves identifying an access pattern for the collaborative content item indicating access of the collaborative content item by user accounts within the plurality of teams and generating the team scores utilizing the team score generation model to determine, from the access pattern, measures of correspondence between the collaborative content item and each of the plurality of teams. Determining an access pattern can involve determining access frequencies of the collaborative content item from user accounts within respective teams from among the plurality of teams.

In some cases, the act 1020 involves identifying a sharing pattern for the collaborative content item indicating sharing of the collaborative content item by user accounts within the plurality of teams. Additionally, the act 1020 involves utilizing the team score generation model to analyze the sharing pattern. Identifying the sharing pattern can involve determining frequencies of user accounts within respective teams sharing the collaborative content item. The act 1020 can involve identifying an access pattern for the collaborative content item indicating access of the collaborative content item by user accounts within the plurality of teams and utilizing a team score generation model to generate, from the access pattern, measures of correspondence between the collaborative content item and respective teams from the plurality of teams.

Further, the series of acts 1000 includes an act 1030 of incorporating the collaborative content item into a team content collection. In particular, the act 1030 involves, based on the team scores, incorporating the collaborative content item into a team content collection provided to user accounts belonging to a selected team from among the plurality of teams.

In some embodiments, the series of acts 1000 includes an act of comparing the team scores for the plurality of teams. Additionally, the series of acts 1000 includes an act of, based on comparing the team scores, providing the team content collection including the collaborative content item to only the user accounts belonging to the selected team. For example, the series of acts 1000 includes an act of comparing the team scores for the plurality of teams to determine that the selected team has a highest team score from among the plurality of teams. In addition, the series of acts 1000 includes an act of, based on determining that the selected team has the highest team score, providing the team content collection including the collaborative content item to only user accounts belonging to the selected team.

In some cases, the series of acts 1000 includes an act of determining that a team score associated with the selected team satisfies a threshold team score as well as an act of identifying an additional team from among the plurality of teams with an additional team score that satisfies the threshold team score. Further, the series of acts 1000 includes an act of providing the team content collection including the collaborative content item to the user accounts belonging to the selected team and to additional user accounts belonging to the additional team based on the team score and the additional team score satisfying the threshold team score. For example, the series of acts 1000 includes an act of comparing the team scores for the plurality of teams with a threshold team score and an act of determining that the selected team belongs to a set of teams that satisfy the threshold team score. Further, the series of acts 1000 includes an act of providing the team content collection including the collaborative content item to user accounts belonging to the set of teams.

The series of acts 1000 can include an act of determining a semantic meaning associated with the collaborative content item. In addition, the series of acts 1000 includes an act of comparing the semantic meaning of the collaborative content item with semantic meanings associated with groups of collaborative content items within the team content collection. The series of acts 1000 can also include an act of placing the collaborative content item into a section of the team content collection corresponding to the semantic meaning (e.g., based on the comparison).

In some embodiments, the series of acts 1000 includes an act of grouping collaborative content items within the team content collection according to semantic similarities between the collaborative content items within the team content collection. Additionally, the series of acts 1000 includes acts of determining a semantic meaning associated with the collaborative content item and identifying, for placing the collaborative content item within the team content collection, a group of collaborative content items corresponding to the semantic meaning. Further, the series of acts 1000 can include determining the team scores based on determining a type of activity performed by user accounts that access the collaborative content item. Further still, the series of acts 1000 can include acts of receiving a request to add a new user account to the selected team from among the plurality of teams and providing the team content collection to the new user account in response to the request.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
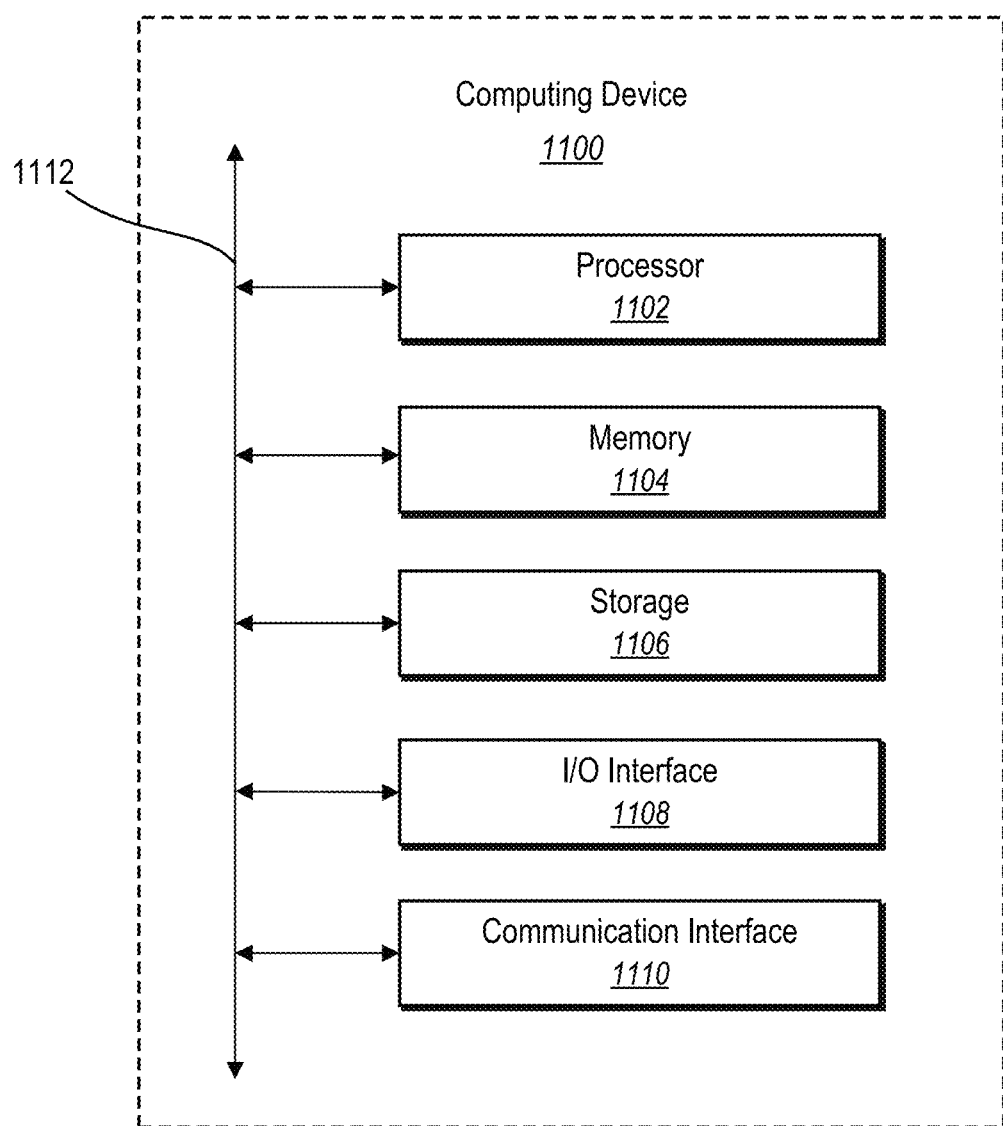
FIG. 11 illustrates a block diagram of an exemplary computing device in accordance with one or more embodiments.

FIG. 11 illustrates a block diagram of exemplary computing device 1100 that may be configured to perform one or more of the processes described above. One will appreciate that server(s) 104, the client devices 108a-108n, and/or the computing device 900 may comprise one or more computing devices such as computing device 1100. As shown by FIG. 11, computing device 1100 can comprise processor 1102, memory 1104, storage device 1106, I/O interface 1108, and communication interface 1110, which may be communicatively coupled by way of communication infrastructure 1112. While an exemplary computing device 1100 is shown in FIG. 11, the components illustrated in FIG. 11 are not intended to be limiting. Additional or alternative components may be used in other implementations. Furthermore, in certain implementations, computing device 1100 can include fewer components than those shown in FIG. 11. Components of computing device 1100 shown in FIG. 11 will now be described in additional detail.

In particular implementations, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage device 1106 and decode and execute them. In particular implementations, processor 1102 may include one or more internal caches for data, instructions, or addresses. As an example and not by way of limitation, processor 1102 may include one or more instruction caches, one or more data caches, and one or more translation lookaside buffers (TLBs). Instructions in the instruction caches may be copies of instructions in memory 1104 or storage device 1106.

Memory 1104 may be used for storing data, metadata, and programs for execution by the processor(s). Memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1104 may be internal or distributed memory.

Storage device 1106 includes storage for storing data or instructions. As an example and not by way of limitation, storage device 1106 can comprise a non-transitory storage medium described above. Storage device 1106 may include a hard disk drive (HDD), a floppy disk drive, flash memory, an optical disc, a magneto-optical disc, magnetic tape, or a Universal Serial Bus (USB) drive or a combination of two or more of these. Storage device 1106 may include removable or non-removable (or fixed) media, where appropriate. Storage device 1106 may be internal or external to computing device 1100. In particular implementations, storage device 1106 is non-volatile, solid-state memory. In other implementations, Storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1108 allows a user to provide input to, receive output from, and otherwise transfer data to and receive data from computing device 1100. I/O interface 1108 may include a mouse, a keypad or a keyboard, a touch screen, a camera, an optical scanner, network interface, modem, other known I/O devices or a combination of such I/O interfaces. I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1108 is configured to provide graphical data to a display for presentation to a user. The graphical data may be representative of one or more graphical user interfaces and/or any other graphical content as may serve a particular implementation.

Communication interface 1110 can include hardware, software, or both. In any event, communication interface 1110 can provide one or more interfaces for communication (such as, for example, packet-based communication) between computing device 1100 and one or more other computing devices or networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MIMS"), radio frequency ("RF") signaling technologies, Long Term Evolution ("LTE") technologies, wireless communication technologies, in-band and out-of-band signaling technologies, and other suitable communications networks and technologies.

Communication infrastructure 1112 may include hardware, software, or both that couples components of computing device 1100 to each other. As an example and not by way of limitation, communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 12:
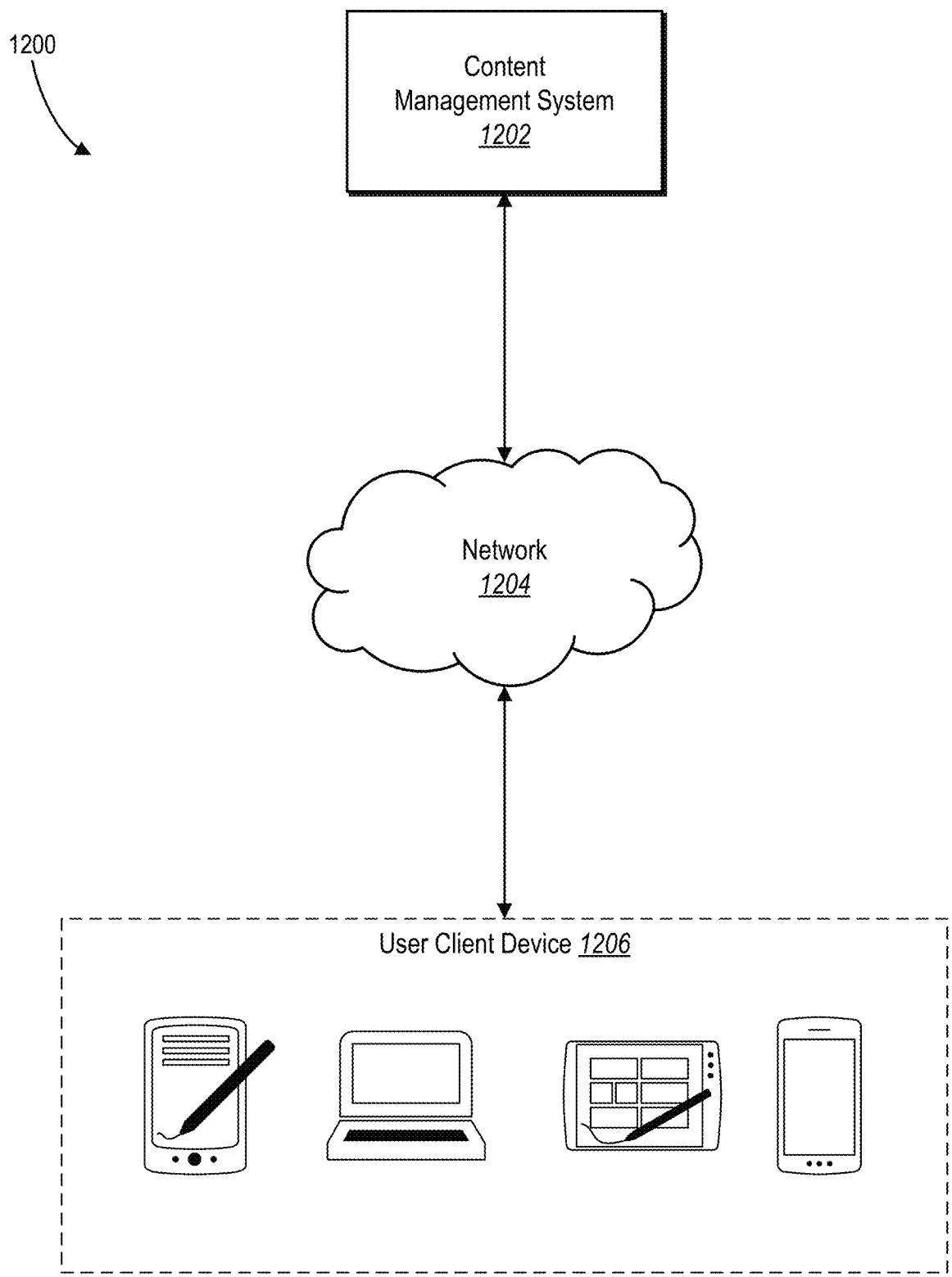
FIG. 12 illustrates an example environment of a networking system having the team content identification system in accordance with one or more embodiments.

FIG. 12 is a schematic diagram illustrating environment 1500 within which one or more implementations of the team content identification system 102 can be implemented. Team content identification system 1202 may generate, store, manage, receive, and send digital content (such as collaborative content items). For example, team content identification system 1202 may send and receive digital content to and from client devices 1206 by way of network 1204. In particular, team content identification system 1202 can store and manage a collection of digital content. Team content identification system 1202 can manage the sharing of digital content between computing devices associated with a plurality of users. For instance, team content identification system 1202 can facilitate a user sharing a digital content with another user of team content identification system 1202.

In particular, team content identification system 1202 can manage synchronizing digital content across multiple client devices 1206 associated with one or more users. For example, a user may edit digital content using client device 1206. The team content identification system 1202 can cause client device 1206 to send the edited digital content to team content identification system 1202. Team content identification system 1202 then synchronizes the edited digital content on one or more additional computing devices.

In addition to synchronizing digital content across multiple devices, one or more implementations of team content identification system 1202 can provide an efficient storage option for users that have large collections of digital content. For example, team content identification system 1202 can store a collection of digital content on team content identification system 1202, while the client device 1206 only stores reduced-sized versions of the digital content. A user can navigate and browse the reduced-sized versions (e.g., a thumbnail of a digital image) of the digital content on client device 1206. In particular, one way in which a user can experience digital content is to browse the reduced-sized versions of the digital content on client device 1206.

Another way in which a user can experience digital content is to select a reduced-size version of digital content to request the full- or high-resolution version of digital content from team content identification system 1202. In particular, upon a user selecting a reduced-sized version of digital content, client device 1206 sends a request to team content identification system 1202 requesting the digital content associated with the reduced-sized version of the digital content. Team content identification system 1202 can respond to the request by sending the digital content to client device 1206. Client device 1206, upon receiving the digital content, can then present the digital content to the user. In this way, a user can have access to large collections of digital content while minimizing the amount of resources used on client device 1206.

Client device 1206 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1206 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1204.

Network 1204 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1206 may access team content identification system 1202.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
   identifying, from a repository of collaborative content items, a set of candidate collaborative content items to analyze for inclusion within one or more team content collections, wherein the set of candidate collaborative content items is accessible to user accounts associated with an organizational ontology indicating relationships between a plurality of teams of user accounts;
   determining, for a collaborative content item within the set of candidate collaborative content items and, team scores indicating measures of correspondence between the collaborative content item and the plurality of teams within the organizational ontology by utilizing a team score generation model that processes team-specific access patterns of the collaborative content item to compare the team-specific access patterns across the plurality of teams;
   determining a semantic meaning for the collaborative content item by processing digital content of the collaborative content item using a semantic meaning model to generate a label describing the digital content within the collaborative content item;
   based on the team scores and the semantic meaning associated with the collaborative content item, generating a team content collection including the collaborative content item for providing to user accounts belonging to a selected team from among the plurality of teams of the organizational ontology;
   automatically updating the team content collection over time by monitoring client device communications over a network to detect client device interactions and to modify the team-specific access patterns of the collaborative content item utilizing the team score generation model based on the client device interactions; and
   providing, for display on a client device associated with a user account added to the selected team, the team content collection including the collaborative content item.

2. The method of claim 1, further comprising:
   comparing the team scores for the plurality of teams; and
   based on comparing the team scores, providing the team content collection including the collaborative content item to only the user accounts belonging to the selected team.

3. The method of claim 1, further comprising:
   determining that a team score associated with the selected team satisfies a threshold team score;
   identifying an additional team from among the plurality of teams with an additional team score that satisfies the threshold team score; and
   providing the team content collection including the collaborative content item to the user accounts belonging to the selected team and to additional user accounts belonging to the additional team based on the team score and the additional team score satisfying the threshold team score.

4. The method of claim 1, further comprising:
   generating a plurality of sections within the team content collection corresponding to different semantic meanings of collaborative content items; and
   placing the collaborative content item into a section of the team content collection corresponding to the semantic meaning.

5. The method of claim 1, wherein identifying the set of candidate collaborative content items comprises selecting, from the repository of collaborative content items, collaborative content items that are publicly accessible and that have been accessed by at least a threshold number of non-specialized user accounts.

6. The method of claim 1, wherein determining the team scores comprises:
   determining the team-specific access patterns for the collaborative content item indicating access times when user accounts within the plurality of teams access the collaborative content item; and
   utilizing the team score generation model to determine, based at least on the team-specific access patterns, a team from among the plurality of teams with a strongest correspondence to the collaborative content item.

7. The method of claim 6, wherein determining the team-specific access patterns of the collaborative content item comprises determining access frequencies of the collaborative content item on a team-specific basis based on accesses performed by user accounts within respective teams from among the plurality of teams.

8. A system comprising:
   at least one processor; and
   a non-transitory computer readable medium comprising instructions that, when executed by the at least one processor, cause the system to:
      identify, from a repository of collaborative content items, a set of candidate collaborative content items to analyze for inclusion within one or more team content collections, wherein the set of candidate collaborative content items is accessible to user accounts associated with an organizational ontology indicating relationships between a plurality of teams of user accounts;

determine, for a collaborative content item within the set of candidate collaborative content items, team scores indicating measures of correspondence between the collaborative content item and the plurality of teams within the organizational ontology by:

determining team-specific access patterns for the collaborative content item indicating access patterns of the collaborative content item across the plurality of teams; and utilizing a team score generation model to generate the team scores by comparing the team-specific access patterns across the plurality of teams;

determine a semantic meaning for the collaborative content item by processing digital content of the collaborative content item using a semantic meaning model to generate a label describing the digital content within the collaborative content item;

based on the team scores and the semantic meaning associated with the collaborative content item, generate a team content collection including the collaborative content item for providing to user accounts belonging to a selected team from among the plurality of teams;

automatically update the team content collection over time by monitoring client device communications over a network to detect client device interactions and to modify the team-specific access patterns of the collaborative content item utilizing the team score generation model based on the client device interactions; and provide, for display on a client device associated with a user account added to the selected team, the team content collection including the collaborative content item.

9. The system of claim 8, further comprising instructions that, when executed by the at least one processor, cause the system to:

compare the team scores for the plurality of teams to determine that the selected team has a highest team score from among the plurality of teams; and based on determining that the selected team has the highest team score, provide the team content collection including the collaborative content item to only user accounts belonging to the selected team.

10. The system of claim 8, further comprising instructions that, when executed by the at least one processor, cause the system to:

compare the team scores for the plurality of teams with a threshold team score;

determine that the selected team belongs to a set of teams that satisfy the threshold team score; and provide the team content collection including the collaborative content item to user accounts belonging to the set of teams.

11. The system of claim 8, further comprising instructions that, when executed by the at least one processor, cause the system to:

group collaborative content items within the team content collection according to semantic similarities between the collaborative content items within the team content collection; and generate sections within the team content collection corresponding to semantic groups based on grouping the collaborative content items according to semantic similarities.

12. The system of claim 8, further comprising instructions that, when executed by the at least one processor, cause the system to identify the set of candidate collaborative content items by:

selecting, from the repository of collaborative content items, collaborative content items that are publicly accessible and that have been accessed by at least a threshold number of non-specialized user accounts; and excluding, from the set of candidate collaborative content items, collaborative content items that are not publicly accessible, or that have not been accessed by at least the threshold number of non-specialized user accounts, or that include sensitive information.

13. The system of claim 8, further comprising instructions that, when executed by the at least one processor, cause the system to determine the team scores for the plurality of teams by further:

identifying a sharing pattern for the collaborative content item indicating sharing of the collaborative content item by user accounts within the plurality of teams; and utilizing the team score generation model to analyze the sharing pattern.

14. The system of claim 13, wherein identifying the sharing pattern for the collaborative content item comprises determining frequencies of user accounts within respective teams sharing the collaborative content item.

15. A non-transitory computer readable medium comprising instructions that, when executed by at least one processor, cause a computing device to:

identify, from a repository of collaborative content items, a set of candidate collaborative content items to analyze for inclusion within one or more team content collections, wherein the set of candidate collaborative content items is accessible to user accounts associated with an organizational ontology indicating relationships between a plurality of teams of user accounts;

determine, for a collaborative content item within the set of candidate collaborative content items and, team scores indicating measures of correspondence between the collaborative content item and the plurality of teams within the organizational ontology by utilizing a team score generation model that processes team-specific access patterns of the collaborative content item to compare the team-specific access patterns across the plurality of teams;

determine a semantic meaning for the collaborative content item by processing digital content of the collaborative content item using a semantic meaning model to generate a label describing the digital content within the collaborative content item;

based on the team scores and the semantic meaning associated with the collaborative content item, generate a team content collection including the collaborative content item for providing to user accounts belonging to a selected team from among the plurality of teams according to a semantic meaning associated with the collaborative content item;

automatically updating the team content collection over time by monitoring client device communications over a network to detect client device interactions and to modify the team-specific access patterns of the collaborative content item utilizing the team score generation model based on the client device interactions; and provide, for display on a client device associated with a user account added to the selected team, the team content collection including the collaborative content item.

16. The non-transitory computer readable medium of claim 15, further comprising instructions that, when executed by the at least one processor, cause the computing device to incorporate the collaborative content item into a section of the team content collection by:
- comparing the semantic meaning of the collaborative content item with semantic meanings associated with groups of collaborative content items within the team content collection; and
- placing the collaborative content item into a group within the team content collection based on comparing the semantic meaning of the collaborative content item with the semantic meanings associated with the groups of collaborative content items.

17. The non-transitory computer readable medium of claim 15, further comprising instructions that, when executed by the at least one processor, cause the computing device to determine the team scores based on determining geographic relationships between user accounts.

18. The non-transitory computer readable medium of claim 15, further comprising instructions that, when executed by the at least one processor, cause the computing device to determine the team scores based on determining a type of activity performed by user accounts that access the collaborative content item.

19. The non-transitory computer readable medium of claim 15, further comprising instructions that, when executed by the at least one processor, cause the computing device to determine the team scores by:
- determining the team-specific access patterns for the collaborative content item indicating access times when user accounts within the plurality of teams access the collaborative content item; and
- utilizing the team score generation model to determine, from the team-specific access patterns, a team from among the plurality of teams with a strongest correspondence to the collaborative content item.

20. The non-transitory computer readable medium of claim 15, further comprising instructions that, when executed by the at least one processor, cause the computing device to:
- receive a request to add a new user account to the selected team from among the plurality of teams; and
- provide the team content collection to the new user account in response to the request.

\* \* \* \* \*